(12) United States Patent
Hu et al.

(10) Patent No.: US 11,780,348 B1
(45) Date of Patent: Oct. 10, 2023

(54) SYSTEMS AND METHODS OF VEHICLE REGENERATIVE CHARGING

(71) Applicant: Rivian IP Holdings, LLC, Plymouth, MI (US)

(72) Inventors: Yang Hu, Irvine, CA (US); Linxiao Geng, Irvine, CA (US); Dapeng Wang, Irvine, CA (US); Rutooj Deelip Deshpande, Irvine, CA (US); Cuong Cao Nguyen, Aliso Viejo, CA (US)

(73) Assignee: RIVIAN IP HOLDINGS, LLC, Irvine, CA (US)

(*) Notice: Subject to any disclaimer, the term of this patent is extended or adjusted under 35 U.S.C. 154(b) by 0 days.

(21) Appl. No.: 18/188,614

(22) Filed: Mar. 23, 2023

(51) Int. Cl.
*B60L 58/12* (2019.01)
*H02J 7/00* (2006.01)
*B60L 7/10* (2006.01)

(52) U.S. Cl.
CPC .............. *B60L 58/12* (2019.02); *B60L 7/10* (2013.01); *H02J 7/007* (2013.01); *H02J 7/0048* (2020.01); *B60L 2240/545* (2013.01); *B60L 2250/26* (2013.01); *H02J 2203/20* (2020.01)

(58) Field of Classification Search
CPC ...... B60L 58/12; B60L 7/10; B60L 2240/545; B60L 2250/26; H02J 7/0048; H02J 7/007; H02J 2203/20

USPC ........................................................ 320/109
See application file for complete search history.

(56) References Cited

U.S. PATENT DOCUMENTS

2017/0274791 A1* 9/2017 Lee .......................... B60L 58/12
2022/0176847 A1* 6/2022 Sugihara .................. B60L 58/18

\* cited by examiner

*Primary Examiner* — Paul Dinh
(74) *Attorney, Agent, or Firm* — Foley & Lardner LLP

(57) ABSTRACT

The present solution is directed to control of maximum current for regenerative charging of an EV battery. A battery management system (BMS) can facilitate, responsive to a first action by an actuator, a discharge of an EV battery. The BMS can identify, responsive to a second action by the actuator, a discharge capacity of the battery corresponding to the discharge associated with the first action. The BMS can determine, responsive to the second action, a temperature measurement and a state of charge measurement of the battery and determine, based on the temperature measurement, the state of charge measurement and the discharge capacity, a derate factor that can be used to modify a current level supplied to the battery during charging of the battery from energy generated responsive to the second action. The BMS can cause the battery to be charged according to the modified current level and the generated energy.

20 Claims, 12 Drawing Sheets

SYSTEMS AND METHODS OF VEHICLE REGENERATIVE CHARGING

INTRODUCTION

Vehicles including electric vehicles (EVs) can generate kinetic energy when they decelerate, brake, or perform other operations.

SUMMARY

The present solution is directed to a model-based management of a derate factor for determining a maximum recharging current to be used in repeated regenerative charging events, while reducing battery degradation caused by excessive recharging currents. Regenerative braking allows kinetic energy from the actuators of the EV (e.g., electric motor or the brakes) to be converted into electrical energy. As a result, recharging events (e.g., events in which EV is decelerated using the electric motor or the brakes) can be used to harness and repurpose the energy generated by the actuators to recharge the battery of the EV.

Generating currents during such recharging events where the generated current over the recharging events in excess of the maximum recharging current limits can lead to accelerated battery degradation. For example, a current exceeding a maximum recharging current limitation can cause an increase in the maximum temperature of the battery and a decrease in the anode potential, which can lead to lithium plating and solid electrolyte interface (SEI) increase, accelerating degradation of the battery. In addition, maximum regenerative charging currents that avoid accelerated battery degradation can vary based the temperature, the state of charge of the battery, or the time duration between two consecutive recharging events. Maximizing the battery recharging efficiency can be even more challenging while preventing accelerated battery degradation when two subsequent regenerative charging events occurs within a time period that is insufficiently long to allow the battery to reach its internal equilibrium after the occurrence of the first of the two subsequent recharging events.

To address this issue and effectively control the maximum allowable regenerative charging current for the subsequent recharging event, the present solution can utilize use a physics-based electrochemical-thermal model of the battery to determine a derate factor of a regenerative charging curve for the second (or any other subsequent regeneration charging event), based on a temperature, a state of charge (SOC), and capacity recovery ratio between the rest/discharge and a prior regeneration event. The present solution can therefore maximize the recharging current applied to the battery during the subsequent regenerative charging events, while at the same time avoiding the regenerative currents from causing accelerated EV battery degradation.

At least one aspect can be directed to a system for current control for regenerative charging. The system can include one or more processors coupled with memory. The one or more processors can identify, responsive to an action by an actuator of an electric vehicle, a discharge capacity of a battery of the electric vehicle corresponding to a discharge of the battery preceding the action by the actuator. The one or more processors can determine, responsive to the action, a temperature measurement and a state of charge measurement of the battery. The one or more processors can determine a derate factor using the temperature measurement, the state of charge measurement and the discharge capacity. The one or more processors can cause the battery to be charged according to a current controlled using the derate factor and energy generated by the actuator.

At least one aspect can be directed to a method of current control of regenerative charging. The method can include identifying, by one or more processors coupled with memory responsive to an action by an actuator of an electric vehicle, a discharge capacity of a battery of the electric vehicle corresponding to a discharge of the battery preceding the action by the actuator. The method can include determining, by the one or more processors responsive to the action, a temperature measurement and a state of charge measurement of the battery. The method can include determine, by the one or more processors, a derate factor using the temperature measurement, the state of charge measurement and the discharge capacity. The method can include causing, by the one or more processors, the battery to be charged according to a current controlled based on the derate factor and energy generated by the actuator.

At least one aspect of the present disclosure can be directed to a vehicle. The vehicle can include one or more processors to determine, following an action of an actuator of an electric vehicle during a charging event, a discharge capacity of a battery of the electric vehicle corresponding to a discharging event preceding the charging event. The vehicle can include the one or more processors to identify, responsive to the action, a temperature measurement and a state of charge measurement of the battery. The vehicle can include the one or more processors to select, according to the temperature measurement, the state of charge measurement and a ratio of the discharge capacity and a charge capacity of the battery input into a lookup table, a derate factor to limit a current to charge the battery. The vehicle can include the one or more processors to cause the battery to be charged according to the current limited according to the derate factor, the current corresponding to energy generated by the actuator responsive to the action.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
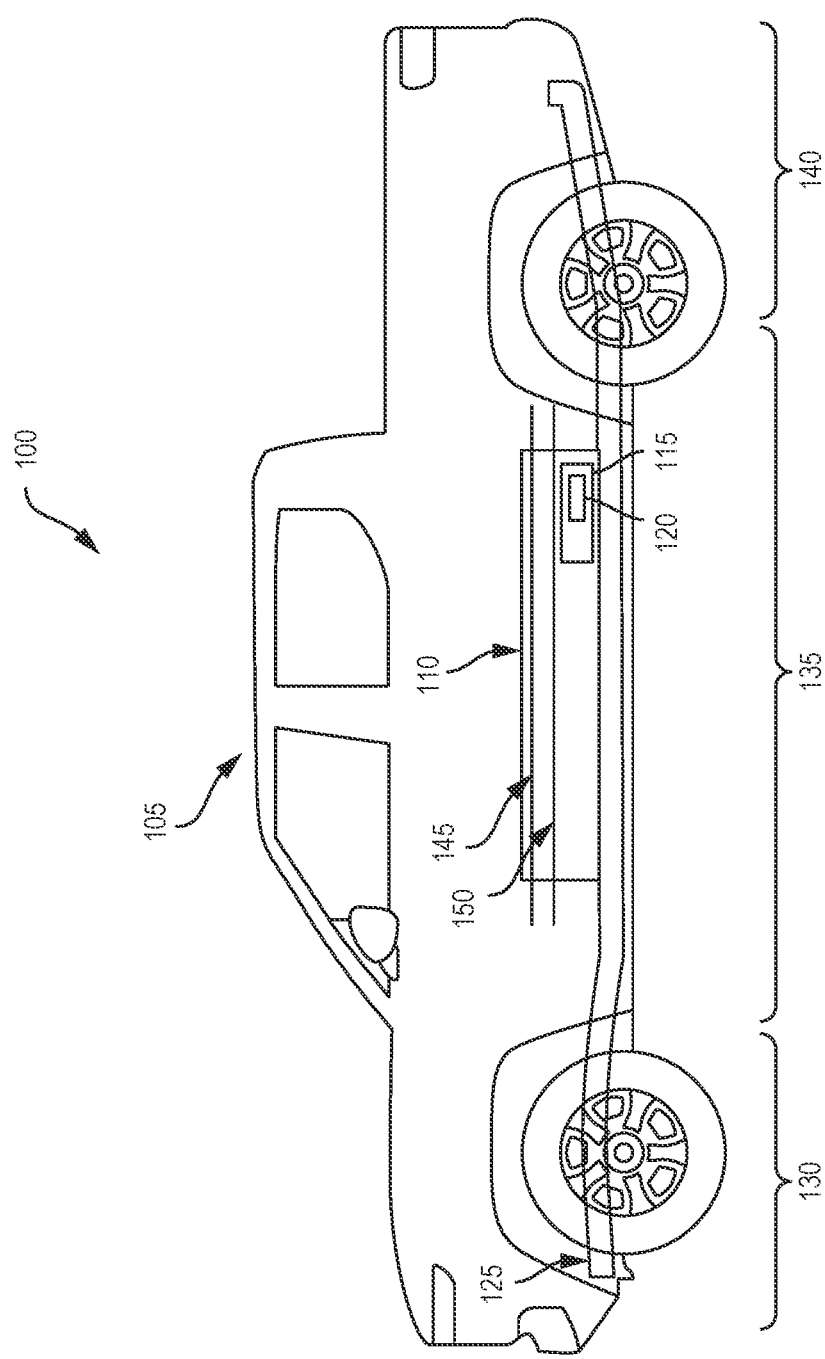
FIG. 1 depicts an example electric vehicle connected to a charging station.

Following below are more detailed descriptions of various concepts related to, and implementations of, methods, apparatuses, and systems of configuring chargers or panels at a charging site. The various concepts introduced above and discussed in greater detail below may be implemented in any of numerous ways.

The present solution is directed to controlling current by which an EV battery is charged during subsequent actuator triggered recharging events whereby accelerated degradation of the EV battery is avoided using a derate factor generated via a physics-based model. Regenerative braking allows kinetic energy from the brakes of an EV to be converted into electrical energy during recharge events (e.g., events in which an EV is decelerated using actuators, such as brakes or electric motors of the EV). Once generated by the actuators, the energy from the actuators can be converted into electrical energy, which can then be used to recharge the EV battery.

When the current charging the EV battery exceeds a maximum allowable level, excessive current can increase the maximum temperature of the battery and decrease the anode potential, which can lead to lithium plating and solid electrolyte interface (SEI) increase, accelerating degradation of the battery. In addition, the amount of regenerative charging current can vary based on several factors (e.g., temperature of the battery, the state of charge of the battery, or timing between two consecutive regeneration events), making it challenging to accurately control the recharging currents in two or more subsequent regenerative charging events when the battery may not have had a sufficient time to reach a steady state. To address this issue and charge the EV battery at the maximum allowable regenerative charging level (while precluding accelerated battery degradation), the present solution can use a physics-based electrochemical-thermal model of the battery. The model can determine a derate factor across a range of time intervals or ratios of discharge and charge capacities corresponding to two consecutive regenerative charging events, a range of temperatures of the battery and a range of a states of charge (SOC) of the battery. For example, the present solution can provide a derate factor table developed based on a validated physics-based electrochemical-thermal model of the battery that is dependent on temperature, state of charge (SOC), and capacity recovery ratio between the discharge event and a prior (e.g., preceding) regenerative charging event. For instances in which the battery has not reached equilibrium (e.g., due to an insufficient amount of time since a prior recharging event), the present solution can provide database with a lookup table by which a derate factor can be determined based on the ratio of discharge capacity and a charge capacity of the battery, a current battery temperature measurement and a current SOC measurement of the battery input into the lookup table. The present solution can utilize the derate factor to limit the recharging current, while also avoiding accelerated EV battery degradation. The advantage of the present solution is that it provides a reliable successive regenerative charging control solution covering multiple real-world operation scenarios, reduces the dimension of derate factor lookup table thereby reducing the amount of utilized on-chip memory and can operate with a battery management system (BMS).

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery, the battery modules 115, or the battery cells 120 with other electrical components of the electric vehicle 105 to provide electrical power to various systems or components of the electric vehicle 105.

Figure 2A:
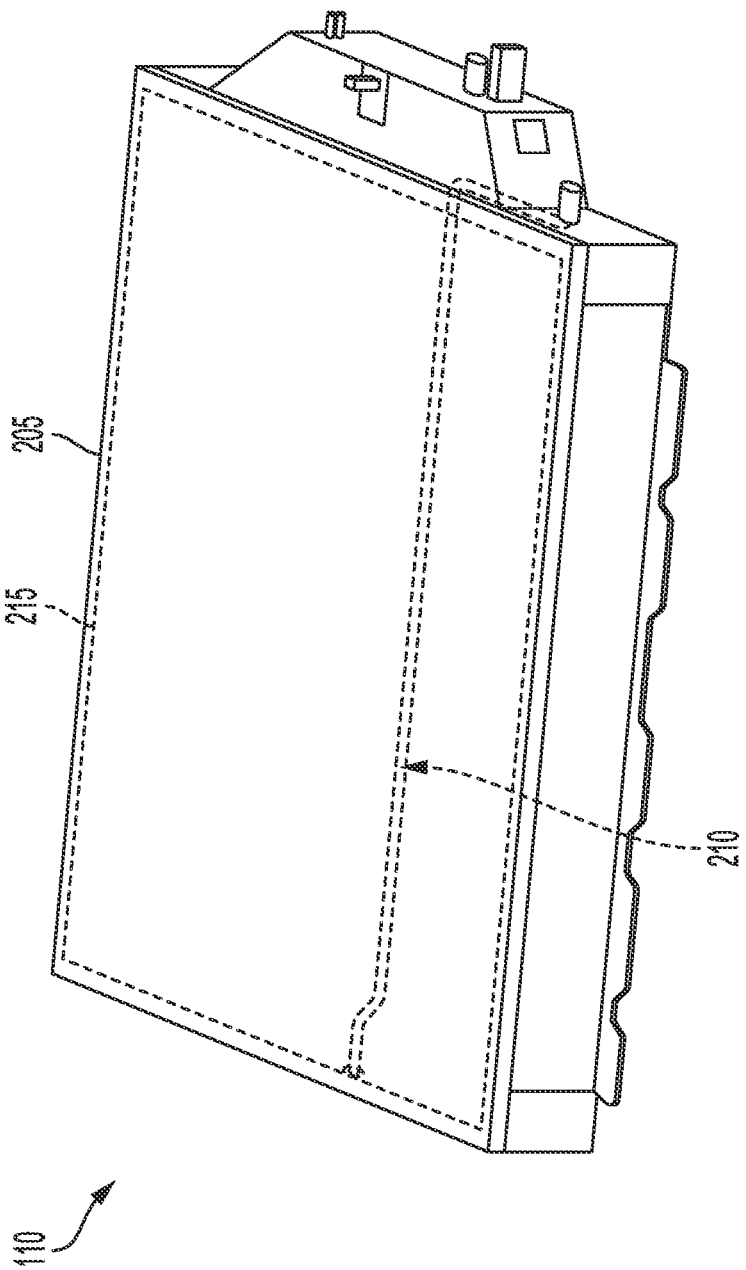
FIG. 2A depicts an example of one or more battery packs.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
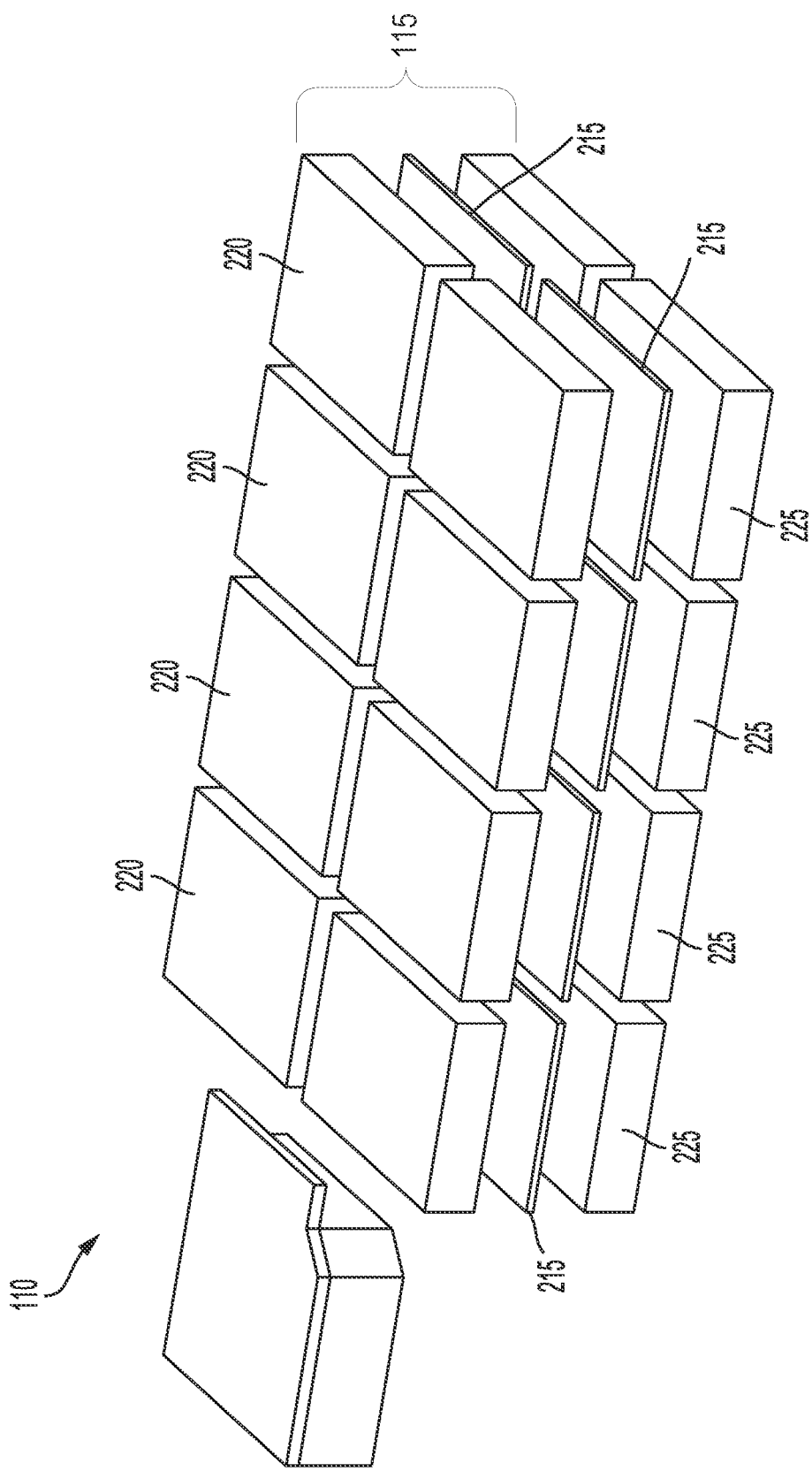
FIG. 2B depicts an example of one or more battery modules.
Figure 2C:
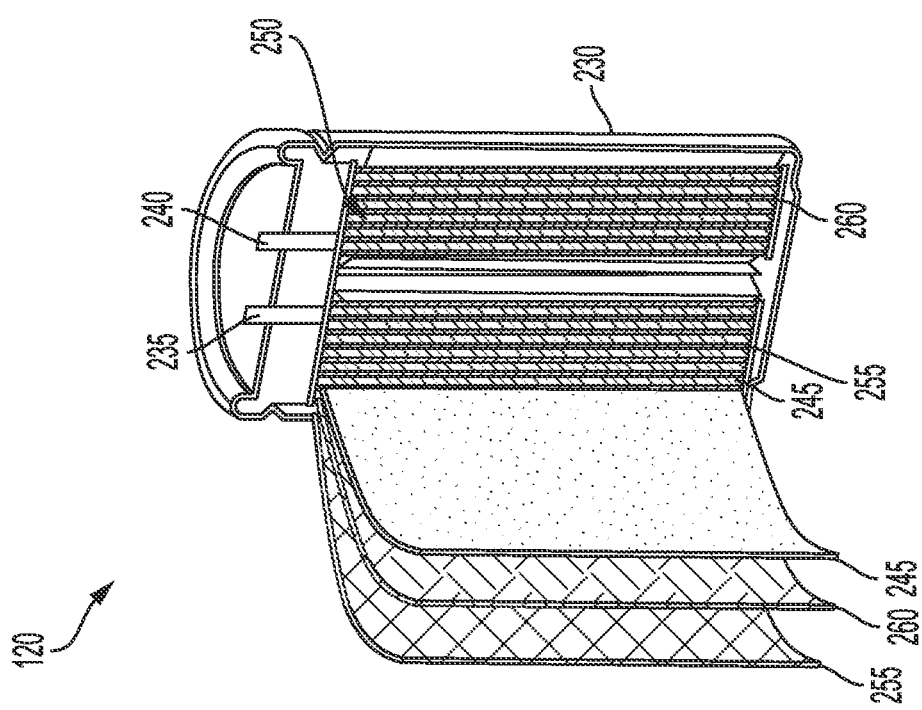
FIG. 2C depicts a cross sectional view of an example battery cell.
Figure 2D:
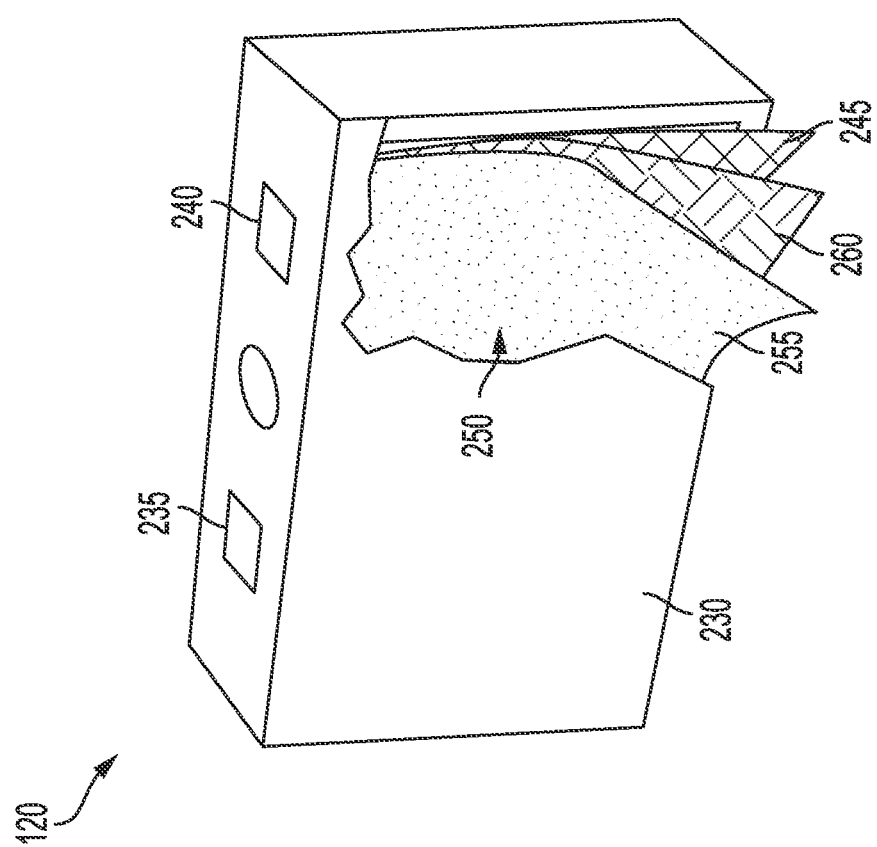
FIG. 2D depicts a cross sectional view of another example of a battery cell.
Figure 2E:
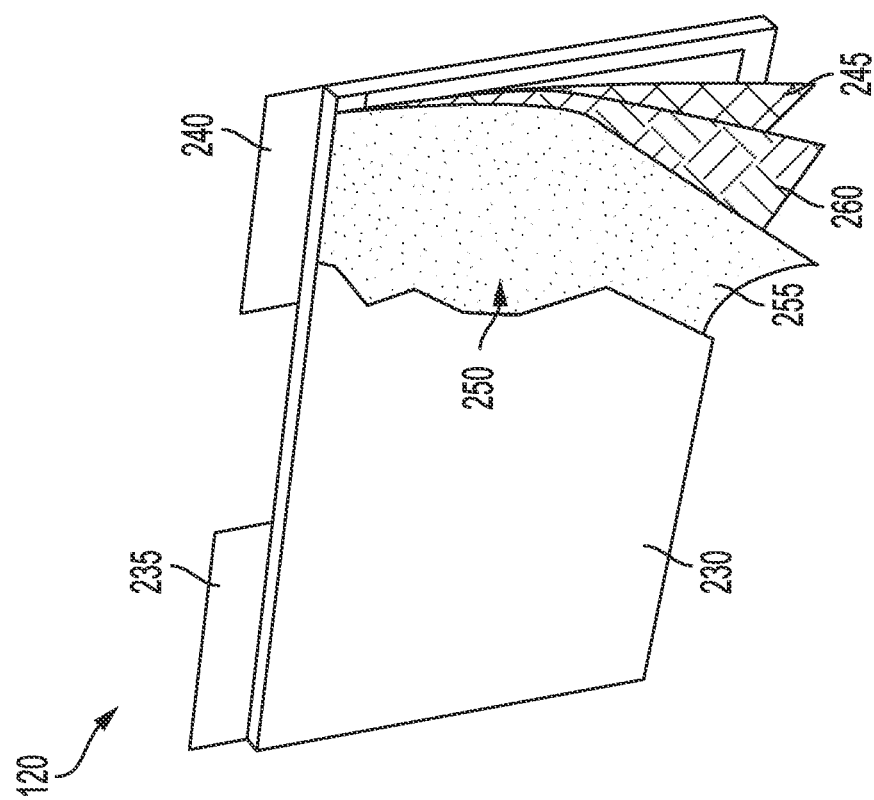
FIG. 2E depicts a cross sectional view of another example of a battery cell.

FIG. 2B depicts example battery modules 115, and FIGS. 2C, 2D and 2E depict an example cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The thermal components 215 shown adjacent to each other can be combined into a single thermal component 215 that spans the size of one or more submodules 220 or 225. The thermal component 215 can be positioned underneath submodule 220 and over submodule 225, in between submodules 220 and 225, on one or more sides of submodules 220, 225, among other possibilities. The thermal component 215 can be disposed in sidewalls, cross members, structural beams, among various other components of the battery pack, such as battery pack 110 described above. The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120. It should be noted the illustrations and descriptions herein are provided for example purposes and should not be interpreted as limiting. For example, the battery cells 120 can be inserted in the battery pack 110 without battery modules 220 and 225. The battery cells 120 can be disposed in the battery pack 110 in a cell-to-pack configuration without modules 220 and 225, among other possibilities.

Battery cells 120 have a variety of form factors, shapes, or sizes. For example, battery cells 120 can have a cylindrical, rectangular, square, cubic, flat, pouch, elongated or prismatic form factor. As depicted in FIG. 2C, for example, the battery cell 120 can be cylindrical. As depicted in FIG. 2D, for example, the battery cell 120 can be prismatic. As depicted in FIG. 2E, for example, the battery cell 120 can include a pouch form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120. The housing 230 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include at least one lithium-ion battery cell. In lithium-ion battery cells, lithium ions can transfer between a positive electrode and a negative electrode during charging and discharging of the battery cell. For example, the battery cell anode can include lithium or graphite (e.g., Si anode, composites or any other LTO, based anode chemistries), and the battery cell cathode can include a lithium-based oxide material (e.g., NMC, LCO, LFP, LMFP conversion cathode). The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxynitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, $SnS$—$P_2S_5$, $Li_2S$—$SiS_2$, $Li_2S$—$P_2S_5$, $Li_2S$—$GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base, as shown in FIG. 2D, among others. As shown in FIG. 2E, among others, the housing 230 can include a pouch form factor. The housing 230 can include other form factors, such as a triangle, a square, a rectangle, a pentagon, and a hexagon, among others. In some embodiments, the battery pack may not include modules (e.g., module-free). For example, the battery pack can have a module-free or cell-to-pack configuration where the battery cells are arranged directly into a battery pack without assembly into a module.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 230 of the battery cell 120 is prismatic (e.g., as depicted in FIG. 2D, among others) or cylindrical (e.g., as depicted in FIG. 2C, among others), the housing 230 can include a rigid or semi-rigid material such that the housing 230 is rigid or semi-rigid (e.g., not easily deformed or manipulated into another shape or form factor). In examples where the housing 230 includes a pouch form factor (e.g., as depicted in FIG. 2E, among others), the housing 230 can include a flexible, malleable, or non-rigid material such that the housing 230 can be bent, deformed, manipulated into another form factor or shape.

The battery cell 120 can include at least one anode layer 245, which can be disposed within the cavity 250 defined by the housing 230. The anode layer 245 can include a first redox potential. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with $sp^2$ hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 255 (e.g., a composite cathode layer compound cathode layer, a compound cathode, a composite cathode, or a cathode). The cathode layer 255 can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also receive lithium ions during the discharging of the battery cell 120. Conversely, the cathode layer 255 can receive electrical current into the battery cell 120 and can output electrons during the charging of the battery cell 120. The cathode layer 255 can release lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. A separator can be wetted with a liquid electrolyte. The liquid electrolyte can be diffused into the anode layer 245. The liquid electrolyte can be diffused into the cathode layer 255. The electrolyte layer 260 can help transfer ions between the anode layer 245 and the cathode layer 255. The electrolyte layer 260 can transfer $Li^+$ cations from the anode layer 245 to the cathode layer 255 during the discharge operation of the battery cell 120. The electrolyte layer 260 can transfer lithium ions from the cathode layer 255 to the anode layer 245 during the charge operation of the battery cell 120.

The redox potential of layers (e.g., the first redox potential of the anode layer 245 or the second redox potential of the cathode layer 255) can vary based on a chemistry of the respective layer or a chemistry of the battery cell 120. For example, lithium-ion batteries can include an LFP (lithium iron phosphate) chemistry, an LMFP (lithium manganese iron phosphate) chemistry, an NMC (Nickel Manganese Cobalt) chemistry, an NCA (Nickel Cobalt Aluminum) chemistry, an OLO (Over Lithiated Oxide) chemistry, or an LCO (lithium cobalt oxide) chemistry for a cathode layer (e.g., the cathode layer 255). Lithium-ion batteries can include a graphite chemistry, a silicon-graphite chemistry, or a lithium metal chemistry for the anode layer (e.g., the anode layer 245).

For example, lithium-ion batteries can include an olivine phosphate (LiMPO$_4$, M=Fe and/or Co and/or Mn and/or Ni)) chemistry, LISICON or NASICON Phosphates (Li$_3$M$_2$(PO$_4$)$_3$ and LiMPO$_4$O$_x$, M=Ti, V, Mn, Cr, and Zr), for example lithium iron phosphate (LFP), lithium iron manganese phosphate (LMFP), layered oxides (LiMO$_2$, M=Ni and/or Co and/or Mn and/or Fe and/or Al and/or Mg) examples, NMC (Nickel Manganese Cobalt) chemistry, an NCA (Nickel Cobalt Aluminum) chemistry, or an LCO (lithium cobalt oxide) chemistry for a cathode layer, lithium rich layer oxides (Li$_{1+x}$M$_{1-x}$O$_2$) (Ni, and/or Mn, and/or Co), (OLO or LMR), spinel (LiMn$_2$O$_4$) and high voltage spinels (LiMn$_{1.5}$Ni$_{0.5}$O$_4$), disordered rock salt, Fluorophosphates Li$_2$FePO$_4$F (M=Fe, Co, Ni) and Fluorosulfates LiMSO$_4$F (M=Co, Ni, Mn) (e.g., the cathode layer 255). Lithium-ion batteries can include a graphite chemistry, a silicon-graphite chemistry, or a lithium metal chemistry for the anode layer (e.g., the anode layer 245). For example, a cathode layer having an LFP chemistry can have a redox potential of 3.4 V vs. Li/Li$^+$, while an anode layer having a graphite chemistry can have a 0.2 V vs. Li/Li$^+$ redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the cathode layer 255) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and lithium iron manganese phosphate ("LMFP"). Anode layers (e.g., the anode layer 245) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(m-ethyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte layer 260 can include or be made of a liquid electrolyte material. For example, the electrolyte layer 260 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the electrolyte layer 260 can include, for example, lithium tetrafluoroborate (LiBF$_4$), lithium hexafluorophosphate (LiPF$_6$), and lithium perchlorate (LiClO$_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula ABO$_3$ (A=Li, Ca, Sr, La, and B=Al, Ti), garnet-type with formula A$_3$B$_2$(XO$_4$)$_3$ (A=Ca, Sr, Ba and X=Nb, Ta), lithium phosphorous oxy-nitride (Li$_x$PO$_y$N$_z$). In some embodiments, the solid electrolyte layer can include a glassy, ceramic and/or crystalline sulfide-based electrolyte (e.g., Li$_3$PS$_4$, Li$_7$P$_3$S$_{11}$, Li$_2$S—P$_2$S$_5$, Li$_2$S—B$_2$S$_3$, SnS—P$_2$S$_5$, Li$_2$S—SiS$_2$, Li$_2$S—P$_2$S$_5$, Li$_2$S—GeS$_2$, LiioGeP$_2$Si$_2$) and/or sulfide-based lithium argyrodites with formula Li$_6$PS$_5$X (X=Cl, Br) like Li$_6$PS$_5$Cl). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the electrolyte layer 260 includes a liquid electrolyte material, the electrolyte layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte layer 260 can include at least one additive. The additives can be or include vinylidene carbonate, fluoroethylene carbonate, ethyl propionate, methyl propionate, methyl acetate, ethyl acetate, or a mixture of any two or more thereof. The electrolyte layer 260 can include a lithium salt material. For example, the lithium salt can be lithium perchlorate, lithium hexafluorophosphate, lithium bis(fluorosulfonyl)imide, lithium bis(trifluorosulfonyl) imide, or a mixture of any two or more thereof. The lithium salt may be present in the electrolyte layer 260 from greater than 0 M to about 1.5 M.

Figure 3:
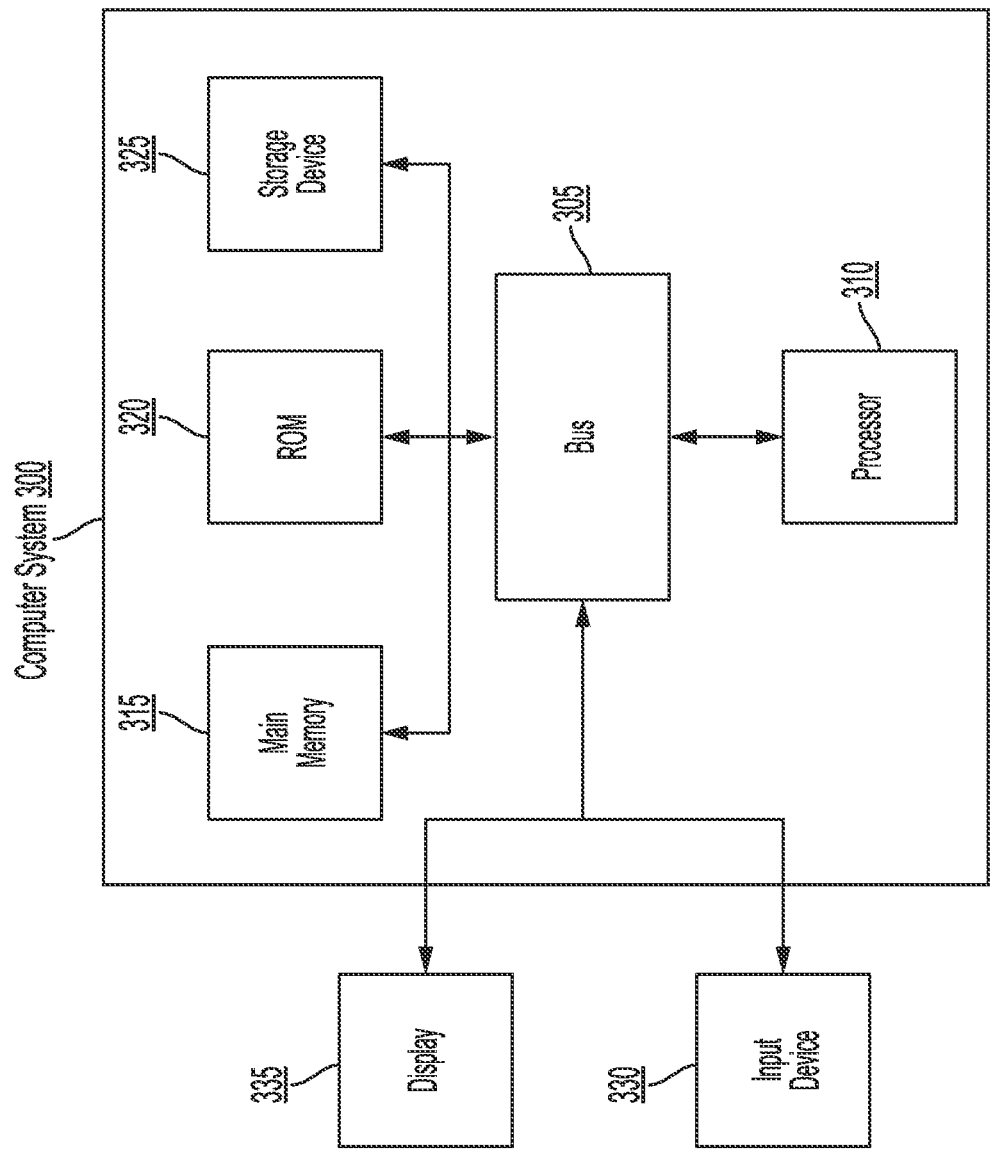
FIG. 3 is a block diagram illustrating an architecture for a computer system that can be employed to implement elements of the systems and methods described and illustrated herein.

FIG. 3 depicts an example block diagram of an example computer system 300, also referred to as a computing system 300. The computer system can include or be used to implement a server 401, a battery model trainer 405, a battery management system 465 or any other features discussed herein. The computing system 300 includes at least one bus 305 or other communication component for communicating information and at least one processor 310 or processing circuit coupled to the bus 305 for processing information. The computing system 300 can also include one or more processors 310 or processing circuits coupled to the bus for processing information. The computing system 300 also includes at least one main memory 315, such as a random access memory (RAM) or other dynamic storage device, coupled to the bus 305 for storing information, and instructions to be executed by the processor 310. The main memory 315 can be used for storing information during execution of instructions by the processor 310. The computing system 300 may further include at least one read only memory (ROM) 320 or other static storage device coupled to the bus 305 for storing static information and instructions for the processor 310. A storage device 325, such as a solid state device, magnetic disk or optical disk, can be coupled to the bus 305 to persistently store information and instructions.

The computing system 300 may be coupled via the bus 305 to a display 335, such as a liquid crystal display, or active matrix display, for displaying information to a user such as a driver of the electric vehicle 105 or other end user. An input device 330, such as a keyboard or voice interface may be coupled to the bus 305 for communicating information and commands to the processor 310. The input device 330 can include a touch screen display 335. The input device 330 can also include a cursor control, such as a mouse, a trackball, or cursor direction keys, for communicating direction information and command selections to the processor 310 and for controlling cursor movement on the display 335.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement may also be employed to execute the instructions contained in main memory 315. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

Figure 4:
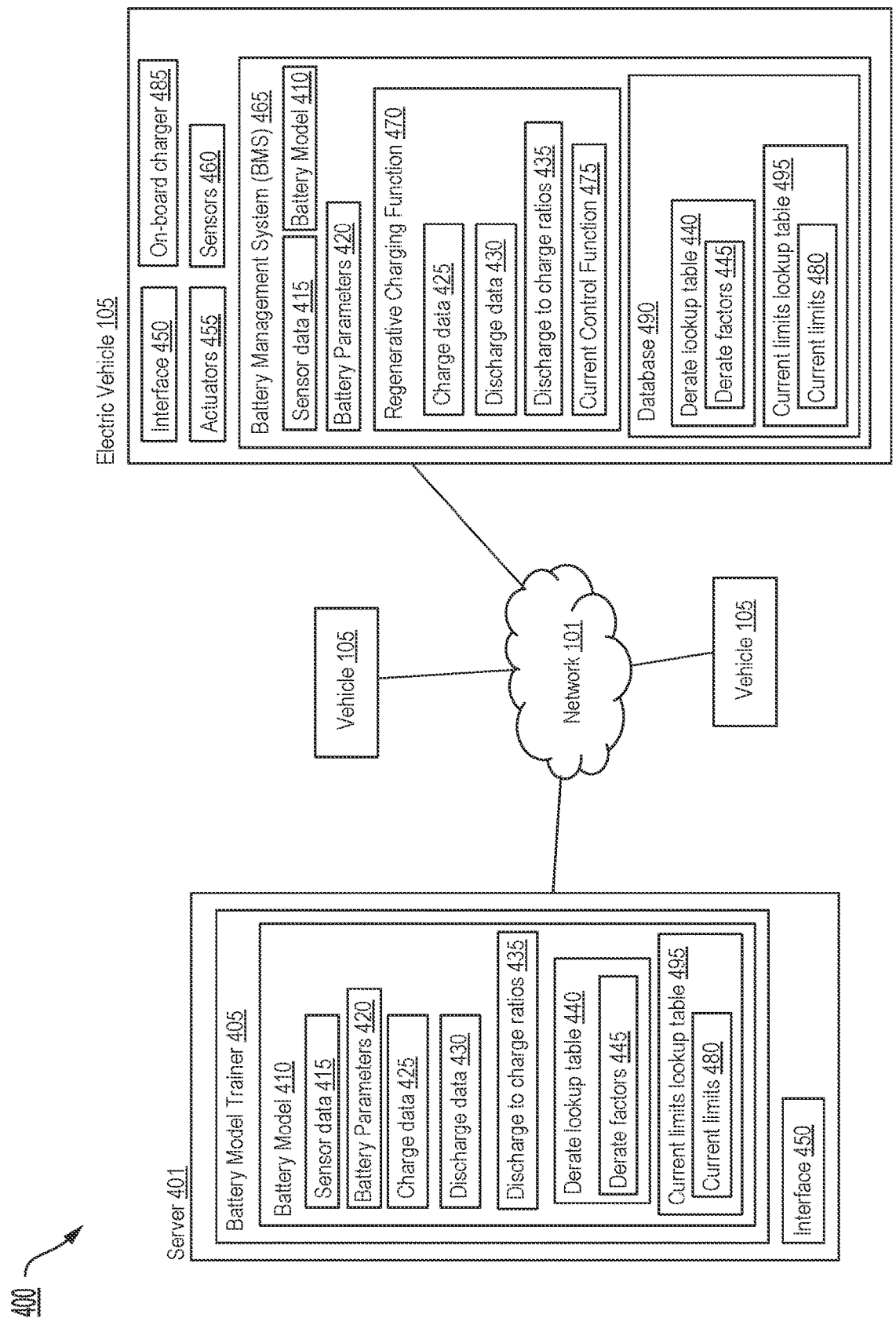
FIG. 4 is a block diagram illustrating an example system for controlling current in recurring regenerative charging events in accordance with embodiments described herein.

FIG. 4 depicts a block diagram of an example system 400 for controlling current in recurring regenerative charging events. System 400 can include one or more servers 401 comprising one or more interfaces 450 and one or more battery model trainers 405 that can include or train one or more battery models 410. Each battery model 410 can include or have access to sensor data 415, battery parameters 420, charge data 425 and discharge data 430. Battery model 410 can include or provide a discharge to charge ratios 435 and one or more derate lookup tables 440 comprising derate factors 445 as well as one or more current limits 480 and one or more current limits lookup tables 495 comprising current limits 480. Across the network 101, vehicle 105 can include one or more interfaces 450, on-board chargers 485, actuators 455, sensors 460 and a battery management system (BMS) 465. The BMS 465 can include one or more sensor data 415, battery models 410, battery parameters 420, regenerative charging functions 470 and databases 490. Regenerative charging function 470 can include one or more charge data 425, discharge data 430, discharge to charge ratios 435 and current control functions 475. BMS 465 can include one or more databases 490 including derate lookup table 440 having derate factors 445 and current limits lookup table 495 including current limits 480.

System 400 can, for example, utilize a remote server 401 executing a battery model trainer 405 to train a battery model 410. The battery model 410 can be trained using any combination of sensor data 415, battery parameters 420, charge data 425, discharge data and discharge to charge ratios 435. Battery model 410 can be trained to provide a derate lookup table 440 with derate values 445 for recharging events when the battery pack 110 is not in equilibrium. Battery model 410 can be trained to provide current limits lookup table 495 with current limits 480 for recharging events when the battery pack 110 is at equilibrium. For example, battery model 410 can be trained to utilize sensor data 415 (e.g., current measurements from actuators 455), battery parameters 420 (e.g., measurements of temperature or SOC of the battery pack 110), charge data 425 (e.g., rate of charge or charge capacity of the battery), discharge data 430 (e.g., rate of discharge or discharge capacity of the battery) or discharge to charge ratio 435 (e.g., ratio of charge capacity to discharge capacity of the battery pack 110 or ratio of discharge capacity to charge capacity of the battery pack 110) to determine current limits 480 or derate factors 445.

System 400 can transmit from the server 401 to the EV 105 the battery model 410, derate factors 445 determined using the battery model 410 or the derate lookup table 440 comprising the derate factors 445 determined using the battery model 410. BMS 465 of the EV 105 can utilize sensor data 415 from sensors 460 or actuators 455 to determine when actuators 455 (e.g., electric motors or brakes of the EV 105) are being activated and the amount of energy being generated by the actuators 455. BMS 465 can detect, using sensors 460, recharging events (e.g., time intervals when the battery pack 110 is being charged by the actuators 455) or discharging events (e.g., time intervals when the battery pack 110 is being discharged to power the EV 105). Regenerative charging function 470 can identify and access current limits 480 from the database 490 for consecutive recharging events in which the battery pack 110 has reached the equilibrium. In such instances, current control function 475 can limit the maximum recharging current in accordance with the current limits 480 from the current limits lookup table 495. Regenerative charging function 470 can identify and access derate factors 445 (e.g., from derate lookup table 440) for consecutive recharging events in which the battery pack 110 has not reached the equilibrium and where derate factors 445 are needed to limit the recharging current. In such instances, current control function 475 can limit the maximum recharging current in accordance with the derate factors 445 from the derate lookup table 440.

Server 401 can include any combination of hardware and software for providing training to a battery model 410. Server 401 can include one or more applications servers connected to a network 101 and communicating with one or more EVs 105. Server 401 can include a service executing on a virtual private network or a cloud. For example, server 401 can include a software as a service (SaaS) application operating on a cloud or one or more virtual machines on one or more network connected computing devices. Server 401 can include any functionality of a computer system 300 or be implemented on one or more computer systems 300.

Battery model trainer 405 can include any combination of hardware and software for training a model 410. Battery model trainer 405 can include scripts, functions and computer code stored in memory or operating on a processor (e.g., 310) for training battery model 410 or any of its internal functions or functionality. Battery model trainer 405 can include the functionality to generate or train the battery model 410 across a range of values corresponding to a current (e.g., measured) state of charge (SOC) of a battery (e.g., battery pack 110, battery modules 115 or battery cells 120). Battery model trainer 405 can include the functionality to generate or train a battery model 410 a range of values corresponding to a current (e.g., measured) temperature of the battery (e.g., battery pack 110, battery modules 115 or battery cells 120). Battery model trainer 405 can include the functionality to generate or train a battery model 410 a range of values corresponding to a current (e.g., measured) discharge data 430 (e.g., discharge capacity), charge data 425 (e.g., charge capacity) or a discharge to charge ratio 435 of the battery (e.g., battery pack 110, battery modules 115 or battery cells 120).

Model battery trainer 405 can include a physics-based model, such as a model performing determinations using physics-based formulas or functions. Model battery trainer 405 can include an electrochemical-thermal model of the battery (e.g., battery pack 110) that utilizes functions to determine relations between inputs (e.g., temperature of the battery pack 110, SOC of the battery pack and capacity recovery ratio between the rest or discharge event of the battery and the prior recharging event) to determine the output (e.g., a derate factor 445 or current limit 480) for limiting the recharging current charging the EV battery pack 110. Model battery trainer 405 can perform the training using an artificial intelligence ("AI") or machine learning ("ML") functions or techniques to find relationship function between the input values and the output (e.g., derate factor 445 or current limit 480). For example, model battery trainer 405 can include any combination of supervised learning, unsupervised learning, or reinforcement learning. Model battery trainer 405 can include the functionality including or corresponding to linear regression, logistic regression, a decision tree, support vector machine, Naïve Bayes, k-nearest neighbor, k-means, random forest, dimensionality reduction function, or gradient boosting functions.

Battery model 410 can include any combination of hardware and software for modeling limitations or derate factors for controlling current for charging an EV battery (e.g., battery pack 110) using energy generated by actuators 455 during recharging events. Battery model 410 can include a physics-based model, such as a model for determining current limits 480 or derate factors 445 using physics-based formulas or functions. Battery model 410 can include an electrochemical-thermal model of the battery (e.g., battery pack 110) that utilizes functions to determine relations between inputs (e.g., temperature of the battery pack 110, SOC of the battery pack and capacity recovery ratio between the rest or discharge event of the battery and the prior recharging event) to determine the output (e.g., a derate factor 445 or current limit 480) for limiting the recharging current charging the EV battery pack 110. For example, battery model 410 can determine a range of current limits 480 based on a range of SOC and a range of a temperature of a battery pack 110, when the battery pack 110 is at equilibrium following a prior recharging event (e.g., when the battery pack 110 has been discharging sufficiently long following with prior recharging event). For example, battery model 410 can determine a range of derate factors 445 based on a range of SOC, a range of a temperature of a battery pack 110 and a range of discharge to charge ratios 435, when the battery pack 110 is not at equilibrium following a prior recharging event (e.g., when the battery pack 110 has not been discharging sufficiently long following with prior recharging event).

Sensor data 415 can include any measurements or data from any sensor 460. Sensor data 415 can include one or more readings or measurements including real-time measurements, time stamped measurements, event-based measurements or periodic measurements. Sensor data 415 can include readings from any type and form of sensor 460. Sensor 460 can include a temperature sensors (e.g., a temperature sensor or circuit at a battery pack 110, battery module 115 or battery cell 120), a current sensor (e.g., a circuit or device measuring current), a voltage sensor (e.g., a circuit or device measuring voltage), a power sensor or energy sensor (e.g., circuit or device measuring power or energy). Sensor 460 can include energy or power sensor measuring output of an actuator 455 (e.g., electric motor or brake of EV 105 generating energy with which battery is to be charged). Actuators 455 can perform any actions generating energy that can be used to charge a battery pack 110. The actions can include, for example, a brake decelerating an EV 105 or an electric motor decelerating the EV 105. For example, sensor 460 can include a pressure sensor, or a movement sensor (e.g., a sensor indicative of a brake of EV 105 being pressed) providing sensor data 415 (e.g., readings or measurements) indicative of an action by an actuator (e.g., brake being pressed). Sensor 460 can include power sensor or energy sensor 460 providing sensor data 415 (e.g., readings or measurements) indicative of an action by an electric motor of the EV 105 (e.g., motor decelerating the EV 105 and producing energy). Sensor data 415 can include SOC measurements of a battery pack 110 or temperature measurements of a battery pack 110.

Battery parameters 420 can include any parameters or readings (e.g., sensor data 415) corresponding to a battery (e.g., battery pack 110, battery module 115 or battery cells 120). Battery parameters 420 can include SOC measurements or readings by sensors 460 at the battery pack 110. Battery parameters 420 can include temperature measurements or readings by sensors 460 at the battery pack 110. Battery parameters 420 can include rate of charge of the battery pack 110 (e.g., current input into the battery), or a rate of discharge of the battery pack 110 (e.g., current output from the battery).

Battery parameter 420 can include timing for the start and end of the regenerative charging events (also referred to as the charge events), including for example a timestamp of the actuator 455 being activated (e.g., brake pressed), a timestamp when the current generated by the actuator 455 has started charging the battery pack 110 and a timestamp when the current generated by the actuator 455 has stopped charging the battery pack. Battery parameter 420 can include the timing for the start and end of the discharging events (e.g., time period between the regenerative charging events) when the battery pack 110 is being discharged.

Charge data 425 can include any data corresponding to the energy or current being charged to the battery pack 110 during a recharging event. For example, charge data 425 can include a charge capacity of the battery, also referred to as the Qc. The charge capacity can include, for example, a total amount of electricity generated due to electrochemical reactions in the battery. The charge capacity can be expressed in ampere hours. For example, a constant discharge current of 1 C (10 A) can be drawn from a 10 Ah battery for 1 hour.

Discharge data 430 can include any data corresponding to the energy or current being discharged from the battery pack 110 during a discharge event, such as an intervening discharge event following a first recharging event triggered by a first action of an actuator 455 (e.g., first act of pressing on a brake of an EV 105) and preceding a second recharging event triggered by a second action of an actuator 455 (e.g., a second act of pressing on the brake of the EV 105). For example, discharge data 430 can include a discharge capacity of the battery, also referred to as the Qd. Discharge capacity can include, for example, a discharge current divided by the theoretical current draw under which the battery pack 110 would deliver its nominal rated capacity in one hour. For example, a 2C discharge rage would deliver the rate capacity of the battery pack 110 in 1 hour.

Discharge to charge ratio 435 can include any combination of a charge capacity (e.g., Qc) and discharge capacity (e.g., Qd) of a battery of the EV 105 (e.g., battery pack 110, battery module 115 or battery cell 120). For example, discharge to charge ratio 435 can include a ratio of a charge capacity of a battery pack 110 divided by a discharge capacity of the battery pack 110 (e.g., Qc/Qd). For example, discharge to charge ratio 435 can include a ratio of a discharge capacity of the battery pack 110 divided by a charge capacity of the battery pack 110 (e.g., Qd/Qc).

Database 490 can include one or more local or distributed databases for storing data corresponding to any information utilized by the BMS 465 or battery model 410, such as the current limits 480 or derate factors 445. Database 490 can include data structures for organizing and storing data. Database 490 can include tables, such as lookup tables (e.g., derate lookup tables 440 and current limits lookup tables 495). Database 490 can include the functionality for selecting, correlating, identifying, accessing or determining derate factors 445 based on inputs, such as, temperature of the battery pack 110, SOC of the battery pack 110 and a discharge to charge ratios 435. Database 490 can include the functionality for selecting, correlating, identifying, accessing or determining current limits 480 based on inputs, such as, temperature of the battery pack 110, SOC of the battery pack 110.

Current limit 480 can include any value for controlling or limiting the maximum current for charging a battery (e.g., battery pack 110, battery module 115 or battery cell 120). Current limit 480 can include a value for scaling, reducing, limiting down-rating or derating a recharging current (e.g., current generated using the energy provided by an actuator 455, such as a brake or an electric motor decelerating the EV 105) that can be provided to or input into a battery pack 110 when the battery pack 110 is in equilibrium. For example, current limit 480 can be used to limit a current charging the EV 105 when a recharging event occurs within a time period after a prior recharging event, when the battery pack 110 has had sufficient time to reach equilibrium. Current limit 480 can limit or reduce the maximum current for charging the battery pack 110 based on the SOC and the temperature of the battery (e.g., battery pack 110, battery module 115 or battery cell 120).

Current limits lookup table 495 can include a multidimensional data structure for identifying a current limit 480 (e.g., a value of the current limit 480) for any value of temperature of the battery and any value of SOC of the battery. For example, current limits lookup table 495 can identify a current limit 480 based on any combination of an input value of a temperature of a battery (e.g., a measurement of temperature of a battery pack 110, battery module 115 or battery cell 120) and an input value of SOC of a battery (e.g., a measurement of SOC of a battery pack 110, battery module 115 or battery cell 120). Current limits lookup table 495 can include a lookup table providing a current limit 480 value for any temperature of the battery pack 110 from a range of temperatures (e.g., −50 C to 70 C) of the battery pack 110 and any SOC of the battery pack 110 from a range of SOCs (e.g., 0% to 100% of charge) of the battery pack. Current limits lookup table 495 can be used for any current limit 480 values when the battery (e.g., battery pack 110, battery module 115 or battery cell 120) is at equilibrium, given an amount of time from a prior recharging event being sufficiently long for the battery to reach the equilibrium.

Derate factor 445 can include any value for controlling or limiting the maximum current for charging a battery (e.g., battery pack 110, battery module 115 or battery cell 120). Derate factor 445 can include a value for scaling, reducing, limiting down-rating or derating a recharging current (e.g., current generated using the energy provided by an actuator 455, such as a brake or an electric motor decelerating the EV 105) that can be provided to or input into a battery pack 110 when the battery pack 110 is not in equilibrium. For example, derate factor 445 can be used to limit a current charging the EV 105 when a recharging event occurs within a time period after a prior recharging event, such that the battery pack 110 has not had sufficient time to reach equilibrium. Derate factor 445 can therefore limit or reduce the maximum current for charging the battery pack 110 more than current limit 480 (e.g., for instances when the battery pack 110 is at the equilibrium).

Derate lookup table 440 can include a multidimensional data structure or table for identifying a derate factor 445 (e.g., a value of the derate factor 445) for any value of temperature of the battery, SOC of the battery and a discharge to charge ratio 435 of the battery. For example, derate lookup table 440 can identify a derate factor 445 based on any combination of inputs, including: a value of a temperature of a battery (e.g., a measurement of temperature of a battery pack 110, battery module 115 or battery cell 120), a value of SOC of a battery (e.g., a measurement of SOC of a battery pack 110, battery module 115 or battery cell 120) and a discharge to charge ratio 435 for the battery (e.g., battery pack 110, battery module 115, or battery cell 120). Derate lookup table 440 can include a lookup table providing a derate value 445 for: any temperature of the battery pack 110 from a range of temperatures (e.g., −50 C to 70 C) of the battery pack 110, any SOC of the battery pack 110 from a range of SOCs (e.g., 0% to 100% of charge) of the battery pack and any discharge to charge ratio 435 (e.g., 0 to 1 for a parameter used to multiply the recharging current).

Interface 450 can include any computer or a digital system interface for digital communication or interaction between a vehicle 105 and a server 401. An interface 450 can include any combination of hardware and software, including scripts, functions and computer code stored in memory or operating on a processor for communicating via a network 101. An interface 450 can include an application interface or a program interface to provide a means of interaction between the server 401 and EV 105. Interface 450 can include the functionality for communicating over a network 101, via any wired or wireless communication protocol (e.g., cable or fiberoptic connection or link, a wireless link, a Bluetooth wireless communication, a wireless fidelity (Wi-Fi) communication, a cellular network communication or any other wired or wireless communication). Interface 450 can include the functionality for sending or receiving a battery model 410, derate lookup table 440 or current limits lookup table 495.

On-board charger 485 can include any combination of hardware and software for charging battery (e.g., battery pack 110, battery module 115 or battery cells 120) during recharging events. For example, current control function 475 can control the current generated by actuator 455 in accordance with either current limit 480 or derate factor 445 using the on-board charger 485 to provide the limited or controlled current to the battery (e.g., battery pack 110, battery module 115 or battery cell 120).

Battery management system (BMS) 465 can include any combination of hardware and software for controlling power, voltage, current or energy of a battery pack 110, battery modules 115 or battery cells 120. BMS 465 can operate on a computer system 300 of an EV 105. BMS 465 can include scripts, controls, computer code or instructions for monitoring, controlling or managing charging or discharging of the battery pack 110. BMS 465 can include the functionality for routing or distribution of the power from the battery pack 110 to the components of the EV 105 (e.g., electric motor, powertrain or other EV 105 components). For example, when a vehicle 105 charges, BMS 465 can regulate power to the battery pack 110. During operation of a moving vehicle 105, BMS 465 can direct power from the battery pack 110 to or from actuators 455 (e.g., electric motor or brakes of the EV 105). During a downhill driving, BMS 465 can direct power from the actuators 455 to the battery pack 110. BMS 465 can include or have access to database 490 for accessing derate lookup tables 440 with derate values 445 or current limits lookup tables 495 with current limits 480. BMS 465 can have access to on-board charger 485 as well as sensor data 415 from any sensors 460 or actuators 455. BMS 465 can utilize regenerative charging function 470 to control or manage current charging the battery pack 110 during recharging events.

Regenerative charging function 470 can include any combination of hardware and software for controlling current provided to the battery (e.g., battery pack 110, battery module 115 or battery cells) during a recharging event (e.g., a time period when the battery is being charged using the energy generated by an actuator 455). Regenerative charging function 470 can monitor sensor data 415 from actuators 455 to determine or detect actions by actuators 455 (e.g., brake being applied or electric motor decelerating the vehicle). Regenerative charging function 470 can track charging (e.g., recharging) and discharging events, including their start and stop times and the state of the battery (e.g., whether the battery is at equilibrium or in a transient state).

Control current function 475 can include any combination of hardware and software for controlling the current for charging a battery (e.g., battery pack 110, battery module 115 or battery cell 120). For example, control current function 475 can include the functionality to limit the maximum current provided to a battery pack 110 during a recharge event. For example, control current function 475 can include the functionality to limit the maximum current provided to battery pack 110 to a current limit 480. Control current function can determine the current limit 480 based on the current limits lookup table 495, such as based on the measurements of SOC and temperature of the battery pack 110 input into the current limits lookup table 495. Control current function can determine the derate factor 445 based on the derate lookup table 440, such as based on the measurements of SOC and temperature of the battery pack 110 as well as discharge to charge ratio 435 input into the derate lookup table 440. Control current function can determine the derate factor 445 by inputting measurements of SOC and temperature of the battery pack 110 as well as measurements of charge capacity and discharge capacity of the battery pack 110 into the derate lookup table 440 (or battery model 410) to select or determine the derate factor 445 to use for limiting the current charging the battery pack 110.

Control current function 475 can determine whether to use current limits lookup table 495 or derate lookup table 440 based on determining whether or not the battery is at equilibrium or transient state. Control current function 475 can determine the state of the battery (e.g., steady state or transient state) based on the value of the discharge capacity of the battery. For example, if the discharge capacity of the battery is measured by a sensor 460 to be below a predetermined threshold, the control current function 475 can determine that the battery is not in a steady state and therefore use derate lookup table 440 instead of the current limits lookup table 495. For example, if the discharge capacity of the battery is measured by a sensor 460 to exceed a predetermined threshold, the control current function 475 can determine that the battery is in a steady state and therefore use a current limits lookup table 495 instead of the derate lookup table 440.

In some aspects, the present solution relates to a system 400 for current control for regenerative charging. The system 400 can include one or more processors (e.g., processors 310) coupled with memory (e.g., memory 315, ROM 320 or storage device 325). The one or more processors 310 can be configured (e.g., via instructions, commands or executed computer code that can be stored in memory) to perform one or more functionalities of the present solution. The one or more processors 310 can be processors of the BMS 465 on the EV 105. The one or more processors 310 can be configured to identify a discharge capacity (e.g., discharge data 430) of a battery (e.g., battery pack 110, battery module 115 or battery cell 120) of the EV 105 corresponding to a discharge of the battery (e.g., 110) preceding the action by the actuator 455. The one or more processors 310 can be configured to identify or determine the discharge capacity, responsive to an action by an actuator 455 of an EV 105 (e.g., a step on a break or a deceleration by an electric motor of the EV).

The one or more processors 310 can be configured to facilitate, responsive to a first action by an actuator of an electric vehicle, a discharge of a battery (e.g., battery pack 110) of the electric vehicle. The action (e.g., the first action, the second action or any other action) can include operation or activity by an actuator 455 (e.g., a motor of the electric vehicle 105 or a brake of the EV 105). The action or operation can include activating (e.g., pressing) the brake to decelerate the vehicle, deactivating (e.g., releasing the pressure) off of the brake to stop deceleration of the vehicle. The action or operation can include increasing the acceleration or operation of an electric motor (e.g., revolutions per minute) of the EV 105. The action or operation can include decelerating the electric vehicle or decreasing the operation of the electric motor. The system 400 can facilitate the discharge of the battery in response to the actuator 455 (e.g., brake) being released or depressed. The system 400 can facilitate the discharge of the battery in response to the actuator 455 (e.g., motor) accelerating or increasing its operation. The discharge can be facilitated, for example, by powering the electric motor (e.g., actuator 455) from the battery pack 110.

The system 400 can detect or identify the second action by the actuator 455. The second action can include pressing of the brake or decelerating of the vehicle or reducing the operation of the electric motor. The second action can trigger generation of energy by the actuator 455. The system 400 can identify, responsive to the second action by the actuator 455 of the electric vehicle, a discharge capacity of the battery corresponding to the discharge associated with the first action by the actuator 455.

The one or more processors 310 can be configured to determine, responsive to the action, a sensor data 415 or battery parameters 420, such as a temperature measurement and a state of charge measurement of the battery (e.g., battery pack 110). For example, the one or more processors 310 of the BMS 465 can receive sensor data 415 of temperature measurements and state of charge measurements of the battery pack 110 from the sensors 460. For example, BMS 465 or a regenerative charging function 470 can determine or receive sensor data 415 corresponding to temperature measurement of a battery pack 110, battery module 115 or battery cell 120 and a SOC measurement of the battery pack 110, battery module 115 or battery cell 120.

The one or more processors 310 can be configured to determine a derate factor 445 using the sensor data 415 or battery parameters 420 (e.g., temperature measurement, the state of charge measurement and the discharge capacity). The one or more processors 310 can determine, based on the temperature measurement, the state of charge measurement and the discharge capacity, a derate factor 445 for charging the battery (e.g., battery pack 110). The derate factor 445 value can be used to modify a current level supplied to the battery (e.g., battery pack 110) during charging of the battery from energy generated responsive to the second action. For example, regenerative charging function 470 can utilize a current control function 475 to identify, determine or select a derate factor 445 value using a derate lookup table 440 stored in a database 490. The derate lookup table 440 can be provided or populated with derate factors 445 using a battery model 410. For example, the regenerative charging function 470 can input into the battery model 410 any combination of the temperature measurement of the battery pack 110, the state of charge measurement of the battery pack, a discharge data 430 (e.g., discharge capacity), charge data 425 (e.g., charge capacity) or discharge to charge ratios 435. Responsive to the inputs, the battery module 410 can provide the derate factor 445 value according to the inputs.

The one or more processors 310 can be configured to cause the battery (e.g., battery pack 110) to be charged according to a current controlled using the derate factor 445 and energy generated by the actuator 455. The one or more processors 310 can be configured to cause the battery (e.g., battery pack 110) to be charged according to the current controlled using the derate factor 445 modified current level and the energy generated by the actuator 455. For example, a current control function 475 can utilize an on-board charger 485 to provide the charge to the battery (e.g., battery packs 110, battery modules 115 or battery cells 120) in accordance with the charge current limited using the derate factor 445.

System 400 can include one or more processors 310 configured to detect the energy generated by the actuator 455 comprising one of a brake of an EV 105 or a motor of the EV 105. The one or more processors 310 can be configured to identify the discharge data 430 (e.g., discharge capacity) based on a measurement taken prior to the action by the actuator 455. For example, BMS 465 can identify discharge capacity of the battery pack 110 based on a measurement taken by a sensor 460 prior to the action by the actuator 455 (e.g., prior to the brake being applied or electric motor of the EV 105 decelerating the EV 105). The one or more processors 310 can be configured to select the derate factor 445 from a derate lookup table 440 generated using a physics-based model 410 configured to provide the derate factor 445 based on the battery parameters 420 (e.g., temperature measurement and the state of charge measurement) and discharge to charge ratio 435 (e.g., ratio of the discharge capacity and a charge capacity of the battery) input into the battery model 410.

The one or more processors 310 can be configured to determine the discharge data 430 (e.g., discharge capacity) corresponding to a discharging event involving a discharge of the battery pack 110 and preceding a current charging event triggered by the action by the actuator 455. For example, BMS 465 can determine the discharge capacity (e.g., discharge data 430) of the battery pack 110 for an event preceding the action by the actuator 455 during which the battery pack 110 was discharging energy to power the EV 105. The one or more processors 310 can be configured to cause the battery pack 110 to be charged during a prior charging event triggered by a prior action by the actuator 455. The prior charging event can precede the discharging event (e.g., discharging event that precedes the current recharging event). The one or more processors 310 can be configured to cause the battery pack 110 to be charged during the prior charging event using a prior energy generated by the actuator 455 during the prior charging event. For example, the one or more processors 310 can be configured to determine the discharge capacity (e.g., 430) corresponding to a discharging event involving a discharge of the battery (e.g., 110) following the first action by the actuator 455 and prior to the second action by the actuator 455. The one or more processors 310 can be configured to cause the battery to be charged during a prior charging event.

The one or more processors 310 can be configured to determine that the battery pack 110 reached a steady state during a second discharging event involving a second discharge of the battery pack 110 that precedes a prior charging event. The prior charging event can be followed by a first discharging event involving a discharge of the battery pack 110. The first discharging event can precede the action by the actuator 455 triggering the current recharging event. The one or more processors 310 can be configured to identify, in response to the determination that the battery pack 110 reached the steady state, a current limit 480 to the recharging current. Current limit 480 can be different from or exclude the derate factor 445 for a second current to charge the battery pack 110 using a second energy generated by the actuator 455 during the prior charging event. For example, the one or more processors 310 can be configured to select, in response to the determination that the battery pack 110 reached the steady state. The one or more processors 310 can, based on battery parameters 420 of the prior charging event (e.g. a prior temperature measurement and a prior state of charge measurement corresponding to the prior charging event) that can be input into a current limits lookup table 495 determine a current limit 480 for a second current to charge the battery pack 110 using a second energy generated by the actuator 455 during the prior charging event. For example, the one or more processors 310 can determine, during a prior charging event triggered prior to the first action and followed by a prior discharging event involving a discharge of the battery prior to the prior charging event, that the battery reached a steady state during the prior discharging event. The one or more processors 310 can select, in response to the determination that the battery reached the steady state during the prior discharging event and based on a prior temperature measurement and a prior state of charge measurement corresponding to the prior charging event and input into a lookup table, a limit for a second current to charge the battery using a second energy generated by the actuator during the prior charging event.

The one or more processors 310 can be configured to identify one of a derate factor 445 or a current limit 480 for the current to charge the battery pack 110 based on a value (e.g., battery parameter 420 or sensor data 415) corresponding to a prior temperature measurement measured during the prior charging event and a value (e.g., battery parameter 420 or sensor data 415) corresponding to a prior state of charge measurement measured during the prior charging event. The one of the derate factor 445 or current limit 480 can be determined during or corresponding to the prior charging event that is followed by a discharging event involving a discharge of the battery pack 110 that precedes the action by the actuator 455. The one or more processors 310 can be configured to cause, during the prior charging event, the battery pack 110 to be charged according to a prior current generated during the prior charging event and controlled using the one of the derate factor 445 or the current limit 480.

The one or more processors 310 can be configured to identify or detect the battery parameter 420 or sensor data 415 (e.g., a temperature measurement) using a sensor 460 configured to measure the temperature of the battery pack 110, battery module 115 or battery cell 120. The one or more processors 310 can be configured to identify or detect the battery parameter 420 or sensor data 415 (e.g., the state of charge) of the battery pack 110, battery module 115 or battery cell 120, based on determination by a battery management system (BMS) 465 of, or corresponding to, the battery pack 110.

The one or more processors 310 can be configured to receive, from a battery management system (BMS) 465 of a battery pack 110, the state of charge measurement (e.g., battery parameter 420). For example, the state of charge measurement can be determined based at least on any one or more of: a current measurement made prior to the battery pack 110 being charged using the energy generated by the actuator 455 or a current measurement made during a discharge of the battery pack 110 prior to the action by the actuator 455.

The one or more processors 310 can be configured to identify the derate factor 445 by a battery model 410 of the battery pack 110 configured to provide the derate factor 445 based on the battery parameter 420 or sensor data 415 (e.g., temperature measurement, the state of charge measurement) as well as discharge to charge ratio 435 (e.g., a charge capacity and a discharge capacity) input into the model. The one or more processors 310 can be configured to identify the derate factor using a physics-based model of the battery, the physics-based model configured to use the temperature measurement and the state of charge measurement to determine at least one of: a voltage response of the battery, an anode potential of the battery, a solid electrolyte interphase (SEI) growth rate in the battery or a temperature increase of the battery.

In some aspects, the present solution is directed to an EV 105. The EV 105 can include one or more processors (e.g., 310) configured (e.g., via instructions, commands or executed computer code stored in memory) to perform one or more functionalities. The one or more processors 310 can include, execute or be included in an EV 105, or in a BMS 465 of the EV 105. The one or more processors 310 can be configured to determine, following an action of an actuator of an electric vehicle 105 during a charging event, a discharge capacity (e.g., discharge data 430) of a battery (e.g., 110, 115 or 120) of the electric vehicle corresponding to a discharging event preceding the charging event. The charging event can include an event in which a battery (e.g., 110, 115 or 120) is charged using energy generated by an actuator 455.

The one or more processors 310 can be configured to identify, responsive to the action, battery parameters 420 or sensor data 415 that can include a temperature measurement and a state of charge measurement of the battery (e.g., 110, 115 or 120). The one or more processors 310 can be configured to select, according to the battery parameters 420 (e.g., temperature measurement, the state of charge measurement) and a ratio of the discharge capacity and a charge capacity (e.g., discharge to charge ratio 435) of the battery input into a derate lookup table 440, a derate factor 445 to limit a current to charge the battery (e.g., 110, 115 or 120). The one or more processors 310 can be configured to cause the battery (e.g., 110, 115 or 120) to be charged according to the current limited according to the derate factor 445. The current to charge the battery can correspond to energy generated by the actuator 455 responsive to the action by the actuator 455 (e.g., energy generated by a brake when the brake is applied by a driver or energy generated by an electric motor when the electric motor decelerates the EV 105).

The one or more processors 310 can be configured to detect the energy generated by the actuator 455 comprising one of a brake or a motor of the electric vehicle 105. The one or more processors 310 can be configured to identify, responsive to the action by the actuator 455, a charge capacity (e.g., charge data 425) of the battery (e.g., 110, 115 or 120). The one or more processors 310 can be configured to cause the battery (e.g., 110, 115 or 120) to be charged using the current limited according to the derate factor 445 determined via a derate lookup table 440 that can be generated using a physics-based battery model 410. The physics-based battery model 410 can be configured to provide the derate factor 445 according to one or more battery parameters 420 or sensor data 415 (e.g., temperature measurement values of the battery, one or more state of charge measurement values of the battery) as well as one or more ratios of a discharge capacity (e.g., discharge data 430) of the battery a charge capacity (e.g., charge data 425) of the battery input into the physics-based battery model 410. For example, the physics-based battery model 410 can be configured to provide the derate factor 445 according to one or more battery parameters 420 or sensor data 415 (e.g., temperature measurement values of the battery, one or more state of charge measurement values of the battery) and a discharge to charge ratio 435 of the battery (e.g., 110, 115 or 120) input into the physics-based battery model 410.

Figure 5:
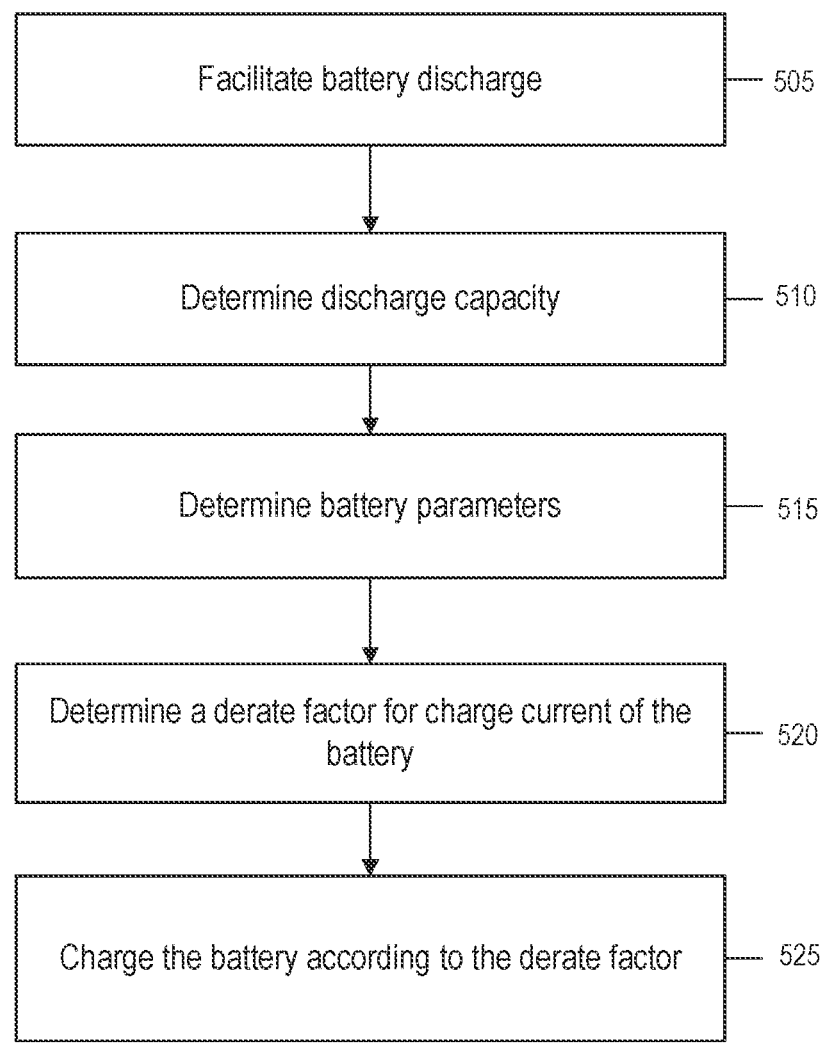
FIG. 5 is a flow diagram illustrating an example method of controlling current in recurring regenerative events in accordance with embodiments described herein.
Figure 6:
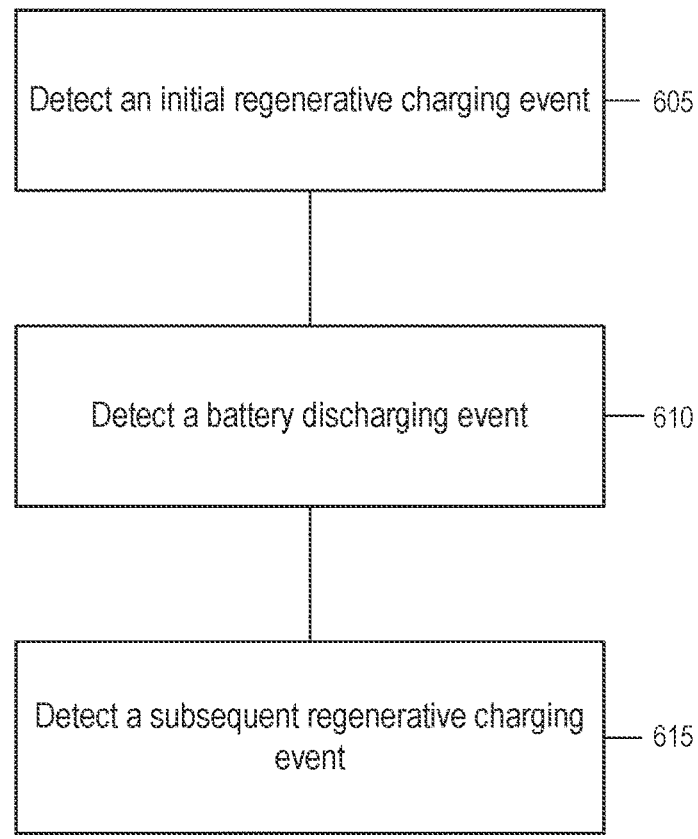
FIG. 6 is a flow diagram illustrating an example method of controlling recurring recharging events in accordance with embodiments described herein.

FIG. 5 illustrates a method 500 of detecting recurring regenerative events and intervening battery discharge events implemented using, for example, system 400 of FIG. 4. The method can include ACTS 505-525. At ACT 505, a battery management system (BMS) can facilitate a battery discharge. At ACT 510, a BMS can determine a discharge capacity. At ACT 515, the BMS can determine the battery parameters. At ACT 520, the BMS can determine a derate factor for charge current of the battery. At ACT 525, the BMS can charge the battery according to the derate factor.

At ACT 505, a BMS can facilitate a battery discharge. The BMS can detect actuator activity. For example, the system of the EV can power the actuator (e.g., electric motor) of the electric vehicle using the energy stored in the battery of the EV. For example, the method can include the one or more processors executing or coupled to the BMS detecting the energy generated by the actuator. The method can include facilitating, by one or more processors coupled with memory responsive to a first action by an actuator of an electric vehicle, a discharge of a battery of the electric vehicle. The actuator can include one of a brake or a motor of the electric vehicle. For example, a sensor detecting or measuring performance or actions of the actuator can detect actuator. The sensor can provide the measurement to the BMS and the BMS can determine that an activity occurred at the actuator. The activity can include an application of the brake, such as when a driver steps on the brake to decelerate the vehicle. The activity can include a deceleration of the vehicle by the electric motor.

Prior to the activity by the actuator, the vehicle can be in a discharge event or a period of time during which the battery of the vehicle (e.g., electric vehicle) provides power (e.g., current) to the vehicle components (e.g., electric motor) to power or move the vehicle. The activity of the actuator can end the discharge event and start a regenerative charging event of the EV.

The one or more processors of the BMS can identify a temperature measurement using a sensor configured to measure the temperature of the battery. The one or more processors of the BMS can identify the state of charge of the battery. For example, a BMS can receive sensor data from the battery sensors or circuitry monitoring performance (e.g., power, energy, voltage, current or charge) of the battery pack and based on the sensor data received, make a determination of the state of charge or temperature of the battery.

At ACT 510, a battery management system can determine a discharge capacity. The method can include the one or more processors of the BMS coupled with memory identifying a discharge capacity of a battery of the electric vehicle corresponding to a discharge of the battery preceding the action by the actuator. The method can include identifying, by the one or more processors responsive to a second action by the actuator of the electric vehicle, a discharge capacity of the battery corresponding to the discharge associated with the first action by the actuator. The BMS can identify or determine the discharge capacity of the battery in response to the action by the actuator (e.g., brake decelerating the vehicle or electric motor decelerating the vehicle). The one or more processors of the BMS can determine the discharge capacity corresponding to a discharging event involving a discharge of the battery following the first action by the actuator and prior to the second action by the actuator.

The method can include the one or more processors identifying the discharge capacity based on a measurement taken prior to the action by the actuator. For example, BMS can take periodic od real-time measurements of the discharge capacity (e.g., discharge data) and the charge capacity (e.g., charge data) of the battery. BMS can take, gather, or collect charge data and discharge data during the period of battery discharge (e.g., discharge event corresponding to a period of time during which battery provides energy output and is not being charged). BMS can take, gather, or collect charge data and discharge data during the period of regenerative charging events (e.g., period of time during which actuators provide energy that is used to recharge the battery).

At ACT 515, the battery management system can determine the battery parameters. The method can include the one or more processors of the BMS to determine a temperature measurement and a state of charge measurement of the battery. For example, the BMS can determine the temperature measurement and the state of charge measurement of the battery responsive to the action by the actuator.

The one or more processors can receive, from the BMS, the state of charge measurement determined by the BMS. The one or more processors can determine the state of charge measurements based on the sensor data. The BMS can determine the state of charge (e.g., charge data) responsive to sensor data received from sensors. The BMS can determine the state of charge of the battery based at least on one of: a current measurement made prior to the battery being charged using the energy generated by the actuator or a current measurement made during a discharge of the battery prior to the action by the actuator.

At ACT 520, the battery management system can determine a derate factor for charge current of the battery. The one or more processors of the BMS can determine a derate factor using the temperature measurement, the state of charge measurement and the discharge capacity. The method can include the one or more processors determining, based on the temperature measurement, the state of charge measurement and the discharge capacity, a derate factor for charging the battery. The derate factor can be configured or used to modify a current level supplied to the battery during charging of the battery from energy generated responsive to the second action. The one or more processors of the BMS can determine the derate factor using the temperature measurement, the state of charge measurement, a charge capacity and the discharge capacity. The one or more processors of the BMS can determine the derate factor using the temperature measurement, the state of charge measurement, and a ratio of the discharge to charge capacity.

The BMS can determine the derate factor responsive to determining that the battery is not in a state of equilibrium. The BMS can determine the derate factor responsive to determining that an amount of time since a preceding regenerative event (e.g., preceding the action by the actuator in ACT 505) does not meet a threshold (e.g., an insufficient amount of time has passed since a prior recharging event).

The derate factor can be determined using a physics-based battery model. For example, the temperature measurement, the state of charge measurement, a charge capacity and the discharge capacity can be input into the battery model and the battery model can provide the derate factor responsive to the inputs. For example, the temperature measurement, the state of charge measurement and a discharge to charge ratio can be input into the battery model and the battery model can provide the derate factor responsive to the inputs.

The one or more processors of the BMS (e.g., regenerative charging function) can select, determine or identify the derate factor from a derate lookup table that can be generated using the physics-based model. The physics based model can be configured to provide the derate factor according to the temperature measurement, the state of charge measurement and a ratio the discharge capacity and a charge capacity of the battery input into the model. The one or more processors can determine the discharge capacity corresponding to a discharging event involving a discharge of the battery. The discharging event (e.g., also referred to as the discharge event) can precede the current charging event triggered by the action by the actuator. The current charging event can be the event started by the action by the actuator to recharge the battery using the energy generated by the actuator, responsive to the action.

The one or more processors of the BMS can determine, during a prior charging event followed by a first discharging event that involves a discharge of the battery precedes the action by the actuator, that the battery reached a steady state during a second discharging event involving a second discharge of the battery, where the second discharging event precedes the prior charging event. The one or more processors of the BMS can identify, in response to the determination that the battery reached the steady state, a current limit (e.g., different from or excluding the derate factor) for a second current to charge the battery using a second energy generated by the actuator during the prior charging event. The current limit can be determined based on, or using, a current limits lookup table.

The one or more processors of the BMS can identify, during a prior charging event followed by a discharging event involving a discharge of the battery and preceding the action by the actuator, one of a derate factor or a current limit for the current to charge the battery. The one of the derate factor or the current limit can be determined based on a value corresponding to a prior temperature measurement measured during the prior charging event and a value corresponding to a prior state of charge measurement measured during the prior charging event. The two derate factor or the current limit can be determined by inputting the value corresponding to the prior temperature measurement measured during the prior charging event and the value corresponding to a prior state of charge measurement measured during the prior charging event into a lookup table. The lookup table can include current limits or derate factors generated using the physics-based battery model.

The one or more processors of the BMS can identify the derate factor by a model of the battery configured to provide the derate factor based on the temperature measurement, the state of charge measurement, a charge capacity and a discharge capacity input into the model. The one or more processors of the BMS can identify the derate factor using the physics-based model of the battery. The physics-based model can be configured to use the temperature measurement and the state of charge measurement to determine at least one of: a voltage response of the battery, an anode potential of the battery, a solid electrolyte interphase (SEI) growth rate in the battery or a temperature increase of the battery.

At ACT 525, the battery management system can charge the battery according to the derate factor. The method can include the one or more processors of the BMS to cause the battery to be charged according to a current controlled based on the derate factor and energy generated by the actuator. The method can include causing, by the one or more processors, the battery to be charged according to the modified current level and the energy generated by the actuator. For example, the BMS can utilize a current control function to use an on-board charger to cause the battery to be charged according to the current limited using the derate factor generated from the derate lookup table or the current limit generated from the current limits lookup table.

The BMS can cause the battery to be charged during a prior charging event triggered prior to the first action and followed by a prior discharging event involving a discharge of the battery prior to the prior charging event. The BMS can cause the battery to be charged during a prior charging event triggered by a prior action by the actuator preceding the discharging event using a prior energy generated by the actuator during the prior charging event. The BMS can cause, during the prior charging event, the battery to be charged according to a prior current generated during the prior charging event and limited using the one of the derate factor or the current limit.

FIG. 5 illustrates a method 600 of controlling current in recurring regenerative events that can be implemented using, for example, system 400 of FIG. 4. The method can include ACTS 605-615. At ACT 605, a battery management system can detect a first regenerative charging event. At ACT 610, a battery management system can detect a battery discharging event. At ACT 615, the battery management system can detect a subsequent regenerative charging event.

At ACT 605, a battery management system can detect an initial (e.g., first) regenerative charging event. For example, the BMS can detect the initial regenerative charging event based on a sensor data or sensor reading from a sensor coupled with, or attached to, an actuator. The initial regenerative charging event can include an event in which an actuator can generate energy to charge an EV. The initial regenerative charging event can begin with an action by the actuator ending a discharging event (e.g., time period during which battery is being discharged and no current or charge is provided to the battery). The initial regenerative charging event can include the BMS controlling (e.g., limiting the maximum value of) the current providing charge to the battery pack of the EV.

At ACT 610, a battery management system can detect a battery discharging event. The battery discharging event, also referred to as the discharge event, can include the time period when the battery no longer receives current or charge using the energy generated by the actuator, but instead only provides charge or energy to the EV in order to power the EV. The battery discharging event can be determine that an initial regenerative charging event has ended when the current into the battery pack ends. The BMS can determine that the battery discharging event has begun when actuator no longer produces energy for charging the EV. The battery discharging event between two consecutive recharging events can be referred to as an intervening battery discharging events. During the intervening discharging event, the battery can over time reach a state of equilibrium. The intervening discharge event can be referred to as the rest or discharge period.

At ACT 615, the battery management system can detect a subsequent regenerative charging event. The BMS can detect a subsequent regenerative charging event responsive to a detected action by the actuator. The action by the actuator can end the preceding (e.g., intervening) battery discharging event. Depending on whether the battery has achieved the equilibrium during the intervening discharge event or period, the current generated by the actuator during the subsequent regenerative charging event can be limited based either on the current limit from the current limits lookup table (e.g., based on temperature and SOC measurements of the EV battery), or the derate factor (e.g., based on the temperate and SOC measurements of the EV and a ratio of discharge and charge capacities). For example, if the battery has achieved the equilibrium during the intervening discharge event or period, the current generated by the actuator during the subsequent regenerative charging event can be limited based the current limit from the current limits lookup table (e.g., based on temperature and SOC measurements of the EV battery). For example, if the battery has not achieved the equilibrium during the intervening discharge event or period, the current generated by the actuator during the subsequent regenerative charging event can be limited based the derate factor from the derate lookup table (e.g., based on the temperate and SOC measurements of the EV and a ratio of discharge and charge capacities).

Figure 7:
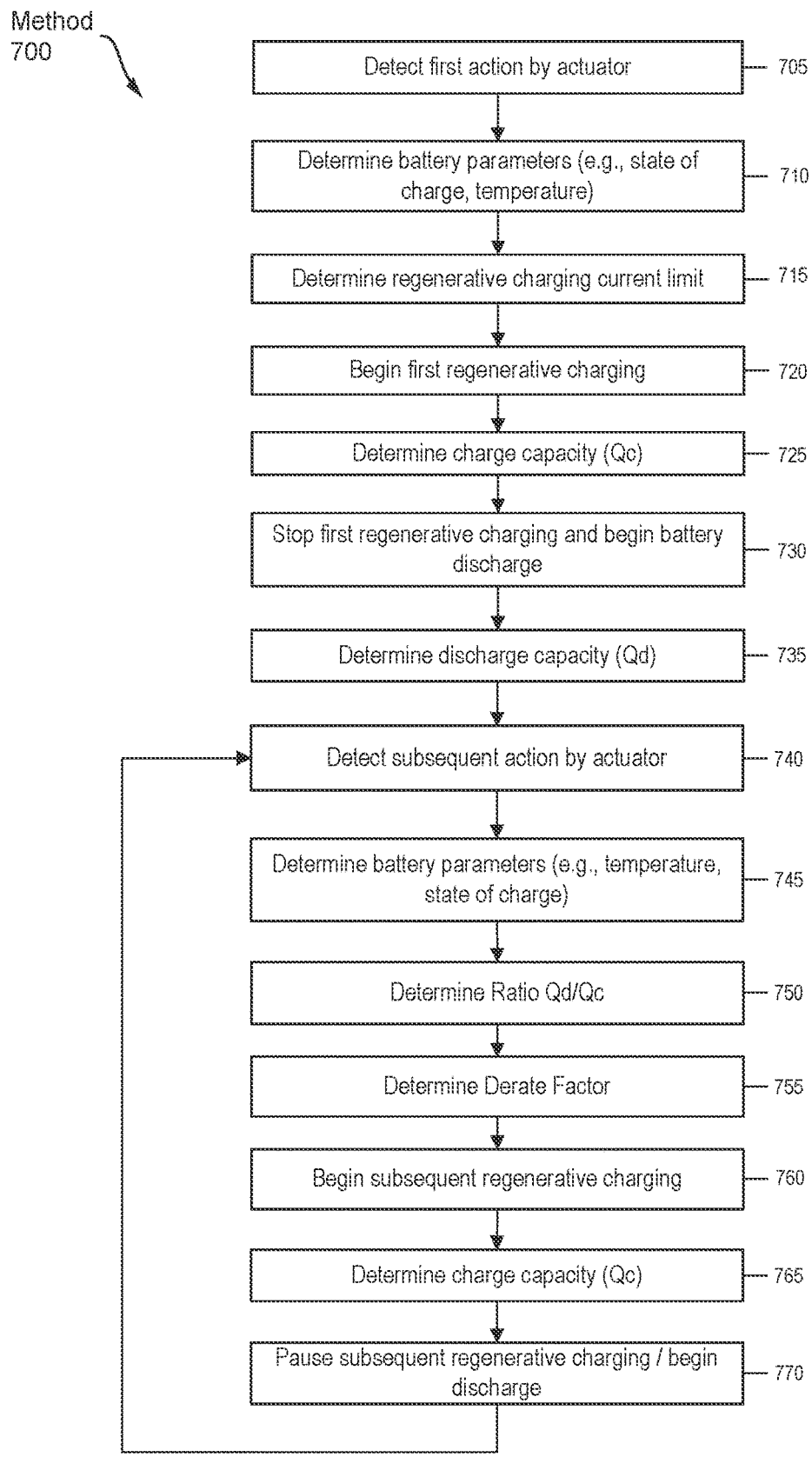
FIG. 7 is a flow diagram illustrating another example method of controlling recurring recharging events in accordance with embodiments described herein.

FIG. 7 illustrates a method 700 of controlling or limiting current generated during recurring regenerative events. Method 700 can be implemented using, for example, system 400 of FIG. 4. The method can include ACTS 705-770. At ACT 705, a sensor can detect a first action by an actuator. At ACT 710, a BMS can determine battery parameters. At ACT 715, the BMS can determine regenerative charging current limit. At ACT 720, the BMS can begin a first regenerative charging. At ACT 725, the BMS determine a charge capacity. At ACT 730, the BMS can stop the first regenerative charging and begin battery discharge. At ACT 735, the BMS can determine the discharge capacity. At ACT 740, the BMS can detect subsequent action by an actuator. At ACT 745, the BMS can determine battery parameters. At ACT 750, the BMS can determine a ratio of discharge capacity and charge capacity. At ACT 755, the BMS can determine a derate factor. At ACT 760, the BMS can begin subsequent regenerative charging. At ACT 765, the BMS can determine charge capacity. At ACT 770, the BMS can pause subsequent regenerative charging and begin battery discharge. For any subsequent recharging events, the method 700 can loop back, from the ACT 770 to ACT 740 and repeat the ACTS from 740 to ACT 770.

At ACT 705, a sensor can detect a first action by an actuator. For example, a sensor can detect a brake of the EV being applied and energy generated by the brake. For example, a sensor can detect an electric motor decelerating and energy generated by the motor.

At ACT 710, a BMS can determine battery parameters. For example, the BMS can receive the temperature reading of the battery pack. The BMS can receive the SOC reading of the battery pack. The BMS can determine or estimate the temperature of the battery pack or the SOC based on other data on the battery (e.g., other sensor readings) or based on signals from the feedback circuitry corresponding to the battery.

At ACT 715, the BMS can determine regenerative charging current limit. For example, the BMS can input the initial temperature and SOC into the table for regeneration charging current limit (e.g., current limits lookup table or derate lookup table) to determine, select or identify the corresponding maximum allowed charging current.

At ACT 720, the BMS can begin a first regenerative charging. Using the identified maximum allowed charging current, the BMS can begin charging the battery. For example, when battery starts being charged using the current limited to the maximum allowed charging current, the first regenerative charging event can start.

At ACT 725, the BMS determine a charge capacity. During the first regenerative charging event, the BMS can determine or monitor charge data (e.g., capacity throughput or charge capacity). The charge capacity can correspond to the charge stored or provided to the battery during the regenerative charging event.

At ACT 730, the BMS can stop the first regenerative charging and begin battery discharge. Once actuator stops producing energy to generate the current to charge the battery, the first regenerative charging can end. The battery can then start the battery discharge (e.g., the intervening battery discharging event).

At ACT 735, the BMS can determine the discharge capacity. During the intervening battery discharging event, the BMS can determine the discharge data (e.g., discharge capacity throughput). The discharge capacity throughput can correspond to the charge output or provided by the battery during the discharging event.

At ACT 740, the BMS can detect subsequent action by an actuator. For example, after a period of time (e.g., up to 10 seconds, 20 seconds, 30 seconds, one minute or two minutes) when the battery is in a discharging event, the BMS can detect another action by an actuator. The action by the actuator can include deceleration by the brake or the electric motor.

At ACT 745, the BMS can determine battery parameters. For example, the BMS receive battery parameters or sensor readings corresponding to the battery. The BMS can determine the temperature and the SOC of the battery.

At ACT 750, the BMS can determine a ratio of discharge capacity and charge capacity. For example, the BMS can use the charge data and the discharge data to determine or generate a discharge to charge ratio value. For example, the BMS can determine a discharge to charge ratio by using a discharge capacity from ACT 735 and a charge capacity from ACT 725. The ratio of discharge capacity and charge capacity can include can include dividing the discharge capacity value by charge capacity value. The ratio of discharge capacity and charge capacity can include can include dividing the charge capacity value by discharge capacity value.

At ACT 755, the BMS can determine a derate factor. The BMS can determine the derate factor in response to determining that the battery is not in equilibrium (e.g., that insufficient amount of time has passed since the first regenerative charging has ended. The BMS can determine the derate factor by inputting the temperature measurement and the SOC measurement from the ACT 745 and a ratio of discharge capacity and charge capacity from ACT 750 into a derate lookup table. The derate lookup table can include derate values determined using a physics-based battery model. For example, the BMS can determine the derate factor by inputting the temperature measurement and the SOC measurement from the ACT 745 and a ratio of discharge capacity and charge capacity from ACT 750 into the battery model, and the battery model can provide the derate factor value.

At ACT 760, the BMS can begin subsequent regenerative charging. The BMS can utilize the current control function to limit the maximum current for charging the battery based on the derate factor determined at ACT 755. The subsequent regenerative charging can include charging of the battery using the current limited based on the derate factor.

At ACT 765, the BMS can determine charge capacity. During the subsequent regenerative charging, the charge capacity of the subsequent regenerative charging event can be determined and monitored (e.g., similar to the way it is done in ACT 725).

At ACT 770, the BMS can pause subsequent regenerative charging and begin battery discharge. For example, similar to the way the first regenerative charging event has ended at ACT 730, the subsequent regenerative charging event can end by the actuator stopping to provide energy for recharging the battery. After the subsequent regenerative charging event ends, the BMS can revert back to the battery discharge (e.g., start another intervening battery discharging event or period).

For any subsequent recharging events, the method 700 can loop back, from the ACT 770 to ACT 740 and repeat the ACTS from 740 to ACT 770 for each additional subsequent recharging event.

Figure 8:
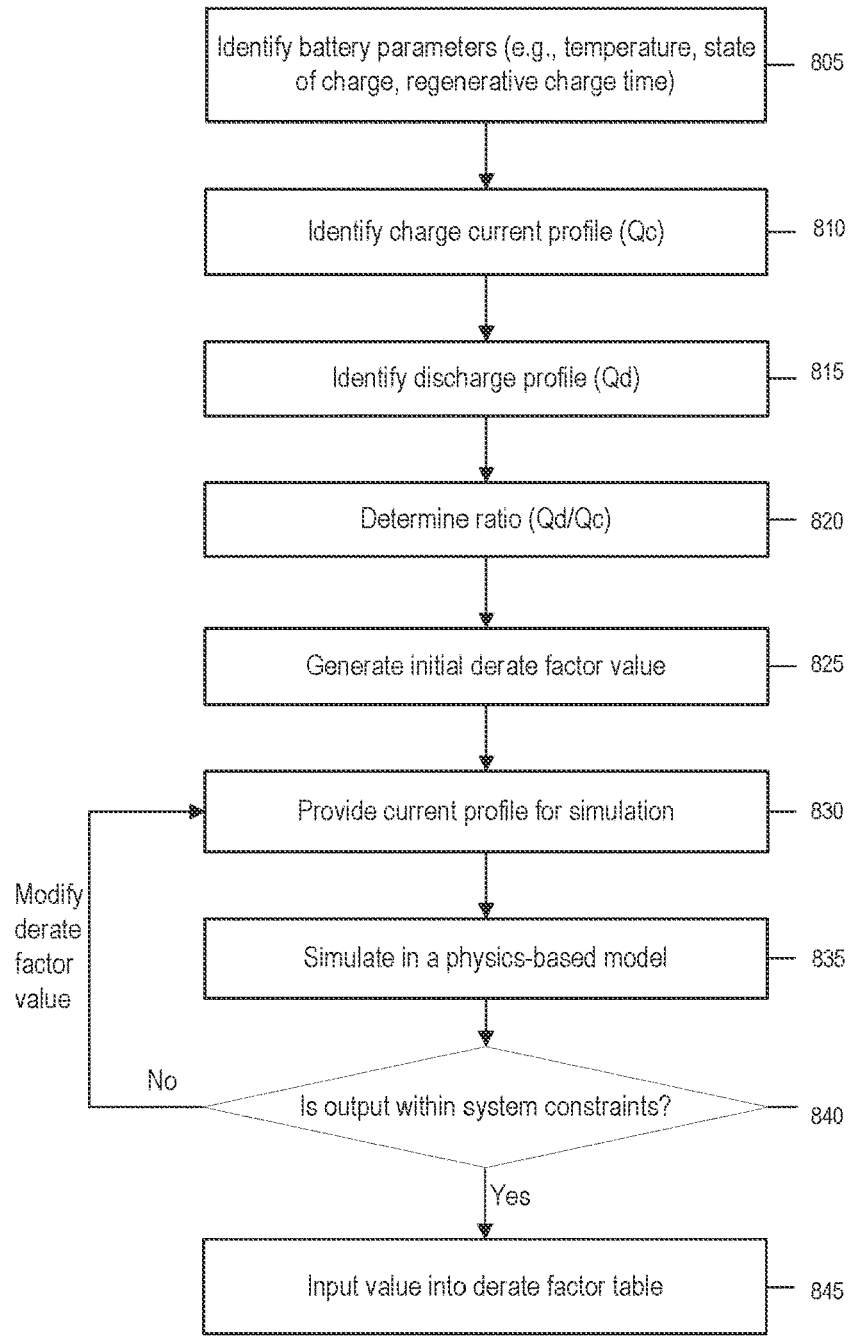
FIG. 8 is a flow diagram illustrating an example method of generating a lookup table of derate factor values in accordance with embodiments described herein.

FIG. 8 illustrates a method 800 of using a battery model to generate a lookup table of values for limiting current recharging a battery during regenerative events. Method 800 can be implemented using the system 400 of FIG. 4. For example, method 800 can be implemented using a computing system 300 of a battery model trainer 405 or a battery management system 465 or the EV 105. The method can include ACTS 805-845. At ACT 805, the computing system can identify battery parameters. At ACT 810, the computing system can identify a charge current profile and charge capacity (Qc). At ACT 815, the computing system can identify a discharge current profile and discharge capacity (Qd). At ACT 820, the computing system can determine a ratio of discharge capacity to charge capacity (Qd/Qc). At ACT 825, the computing system can generate initial derate factor value. At ACT 830, the computing system can provide current profile for simulation. At ACT 835, the computing system can simulate the current profile in a physics-based model. At ACT 840, the computing system check if the output value is within system constraints. At ACT 845, the computing system can input the value (e.g., derate factor) into a derate lookup table.

At ACT 805, the computing system can identify battery parameters. For example, the computing system can initialize, identify or determine temperature of the battery, the SOC of the battery and charge time for a first or initial regenerative charging event. The computing system can use as inputs an entire range of temperature of the battery (e.g., −50 C to 80 C), an entire range of SOC of the battery (e.g., 0% charge to 100% or fully charged). The charge time for the initial regenerative charging event can include any range (e.g., less than one second, up to five second, up to 10 seconds, up to 30 seconds, up to 60 seconds, up to 1 minutes, up to 5 minutes or more than 5 minutes).

At ACT 810, the computing system can identify a charge current profile and charge capacity (Qc). For example the computing system can determine the maximum allowed charging current from the regeneration charging current limit table (e.g., current limits lookup table). For example, the computing system can input the temperature and the SOC measurements into the current limits lookup table and identify the current limit value for the initial regenerative charging event. The computing system can determine or provide a regeneration charge current profile (current vs time). The computing system can determine or calculate a charge capacity throughput (Qc). The charge capacity throughput can be determined using the charge current profile (e.g., current output vs. time plot for the regenerative charge event). For example, the charge capacity can be determined by integrating (e.g., calculating the area under the curve) of the charge current profile.

At ACT 815, the computing system can identify a discharge current profile and discharge capacity (Qd). For example, the computing system can identify or determine a current profile (e.g., current vs. time plot) for a discharge event (e.g., a time period when battery is not charged, but instead only provides current or energy to the EV). The current profile can be provided or limited to a certain range of current rate (e.g., 0C~3C, for example) and a duration (e.g., 0 s~30 s, for example). The computing system can determine the rest/discharge capacity throughput (Qd). For example, the discharge capacity can be determined by integrating (e.g., calculating the area under the curve) of the discharge current profile.

At ACT 820, the computing system can determine a ratio of discharge capacity to charge capacity (Qd/Qc). For example, the computing system can determine a ratio of the discharge capacity to charge capacity by dividing the discharge capacity by charge capacity. For example, the computing system can determine a ratio of the discharge capacity to charge capacity by dividing the charge capacity by discharge capacity. For example, the computing system can determine a ratio of the discharge capacity to charge capacity by any combination of the charge capacity and the discharge capacity.

At ACT 825, the computing system can generate initial derate factor value. The initial derate factor value can be, for example, any value, such as the value of 1, or a value of 100.

At ACT 830, the computing system can provide current profile for simulation. For example, the computing system can generate or combine a current profile for simulation. The current profile to be simulated can include a regeneration charge current, a rest/discharge current and a regeneration charge current multiplied by a derate factor. For example, the current profile can include a regeneration charge current+rest/discharge+regeneration charge current x DF (derate factor).

At ACT 835, the computing system can simulate the current profile in a physics-based model. The computing system can input the combined current profile into a physics-based model. The physics based model can be a model for one or more battery packs, battery modules or battery cells. The physics-based model can process, determine or simulate the voltage response, anode potential, solid electrolyte interphase (SEI) growth rate and temperature increase of the battery (e.g., battery packs, battery modules or battery cells).

At ACT 840, the computing system check if the output value is within system constraints. The computing system can compare the simulated values of each indicator to the corresponding constraints (e.g., limits of battery operation) to determine if the selected derate factor meet the constraints. If the derate factor does meet the constraints, the output value for the derate factor can be included in the derate lookup table. If the derate factor does not meet the constraints, the derate factor value input into the model can be modified (e.g., reduced) and input back into the ACT 830 of the process. Then the process can be repeated from ACT 830 until the derate value satisfying the constraints is identified.

At ACT 845, the computing system can input the value (e.g., derate factor) into a derate lookup table. The computing system can input the derate factor value into derate lookup table as the derate factor value meets the battery constraints. The derate factor value can then be accessed by the system 400 as a function of inputs (e.g., temperature of the battery, the SOC of the battery, and the ratio of discharge capacity to charge capacity (e.g., Qd/Qc).

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions may be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, a positive or a negative terminal of a battery, or power direction when an electric vehicle is charged or discharged. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system for current control for regenerative charging, comprising:
   one or more processors coupled with memory to:
      facilitate, responsive to a first action by an actuator of an electric vehicle, a discharge of a battery of the electric vehicle;
      identify, responsive to a second action by the actuator of the electric vehicle, a discharge capacity of the battery corresponding to the discharge associated with the first action by the actuator;
      determine, responsive to the second action, a temperature measurement and a state of charge measurement of the battery;
      determine, based on the temperature measurement, the state of charge measurement and the discharge capacity, a derate factor for charging the battery, wherein the derate factor is used to modify a current level supplied to the battery during charging of the battery from energy generated responsive to the second action; and
      cause the battery to be charged according to the modified current level and the energy generated by the actuator.

2. The system of claim 1, comprising the one or more processors to:
   detect the energy generated by the actuator comprising one of a brake or a motor of the electric vehicle;
   identify the discharge capacity based on a measurement taken prior to the action by the actuator; and
   select the derate factor from a lookup table generated using a physics-based model configured to provide the derate factor based on the temperature measurement, the state of charge measurement and a ratio the discharge capacity and a charge capacity of the battery input into the model.

3. The system of claim 1, comprising the one or more processors to:
   determine the discharge capacity corresponding to a discharging event involving a discharge of the battery following the first action by the actuator and prior to the second action by the actuator; and
   cause the battery to be charged during a prior charging event triggered prior to the first action by the actuator.

4. The system of claim 1, comprising the one or more processors to:
   determine, during a prior charging event triggered prior to the first action and followed by a prior discharging event involving a discharge of the battery prior to the prior charging event, that the battery reached a steady state during the prior discharging event; and
   select, in response to the determination that the battery reached the steady state during the prior discharging event and based on a prior temperature measurement and a prior state of charge measurement corresponding to the prior charging event and input into a lookup table, a limit for a second current to charge the battery using a second energy generated by the actuator during the prior charging event.

5. The system of claim 1, comprising the one or more processors to:
   identify, during a prior charging event triggered prior to the first action and followed by a discharging event involving a discharge of the battery prior to the prior charging event, one of a derate factor or a limit for the current to charge the battery based on a value corresponding to a prior temperature measurement measured during the prior charging event and a value corresponding to a prior state of charge measurement measured during the prior charging event; and
   cause, during the prior charging event, the battery to be charged according to a prior current generated during the prior charging event and controlled using the one of the derate factor or the limit.

6. The system of claim 1, comprising the one or more processors to:
   identify the temperature measurement using a sensor configured to measure the temperature of the battery; and
   identify the state of charge of the battery based on determination by a battery management system (BMS) of the battery.

7. The system of claim 1, comprising the one or more processors to:
   receive, from a battery management system (BMS) of a battery, the state of charge measurement determined based at least on one of: a current measurement made prior to the battery being charged using the energy generated by the actuator or a current measurement made during a discharge of the battery prior to the action by the actuator.

8. The system of claim 1, comprising the one or more processors to:
   identify the derate factor by a model of the battery configured to provide the derate factor based on the temperature measurement, the state of charge measurement, a charge capacity and a discharge capacity input into the model.

9. The system of claim 1, comprising the one or more processors to:
   identify the derate factor using a physics-based model of the battery, the physics-based model configured to use the temperature measurement and the state of charge measurement to determine at least one of: a voltage response of the battery, an anode potential of the battery, a solid electrolyte interphase (SEI) growth rate in the battery or a temperature increase of the battery.

10. A method of current control for regenerative charging, comprising:
    facilitating, by one or more processors coupled with memory responsive to a first action by an actuator of an electric vehicle, a discharge of a battery of the electric vehicle;
    identifying, by the one or more processors responsive to a second action by the actuator of the electric vehicle, a discharge capacity of the battery corresponding to the discharge associated with the first action by the actuator;
    determining, by the one or more processors responsive to the action, a temperature measurement and a state of charge measurement of the battery;
    determine, based on the temperature measurement, the state of charge measurement and the discharge capacity, a derate factor for charging the battery, wherein the derate factor is used to modify a current level supplied to the battery during charging of the battery from energy generated responsive to the second action; and
    causing, by the one or more processors, the battery to be charged according to the modified current level and the energy generated by the actuator.

11. The method of claim 10, comprising:
    detecting, by the one or more processors, the energy generated by the actuator comprising one of a brake or a motor of the electric vehicle;
    identifying, by the one or more processors, the discharge capacity based on a measurement taken prior to the action by the actuator; and
    selecting, by the one or more processors, the derate factor from a lookup table generated using a physics-based model configured to provide the derate factor according to the temperature measurement, the state of charge measurement and a ratio the discharge capacity and a charge capacity of the battery input into the model.

12. The method of claim 10, comprising:
    determining, by the one or more processors, the discharge capacity corresponding to a discharging event involving a discharge of the battery following the first action by the actuator and prior to the second action by the actuator; and
    causing the battery to be charged during a prior charging event triggered by the first action by the actuator.

13. The method of claim 10, comprising:
    determining, by the one or more processors, during a prior charging event triggered prior to the first action and followed by a prior discharging event involving a discharge of the battery prior to the first action by the actuator, that the battery reached a steady state during the prior discharging; and
    selecting, by the one or more processors in response to the determination that the battery reached the steady state during the prior discharging event and based on a prior temperature measurement and a prior state of charge measurement corresponding to the prior charging event and input into a lookup table, a limit for a second current to charge the battery using a second energy generated by the actuator during the prior charging event.

14. The method of claim 10, comprising:
    identifying, by the one or more processors during a prior charging event triggered prior to the first action and followed by a discharging event involving a discharge of the battery prior to the second action by the actuator, one of a derate factor or a limit for the current to charge the battery based on a value corresponding to a prior temperature measurement measured during the prior charging event and a value corresponding to a prior state of charge measurement measured during the prior charging event; and causing, by the one or more processors, during the prior charging event, the battery to be charged according to a prior current generated during the prior charging event and limited using the one of the derate factor or the limit.

15. The method of claim 10, comprising:

identifying, by the one or more processors, the temperature measurement using a sensor configured to measure the temperature of the battery; and identifying, by the one or more processors, the state of charge of the battery based on determination by a battery management system (BMS) of the battery.

16. The method of claim 10, comprising:

receiving, by the one or more processors from a battery management system (BMS) of a battery, the state of charge measurement determined based at least on one of: a current measurement made prior to the battery being charged using the energy generated by the actuator or a current measurement made during a discharge of the battery prior to the action by the actuator.

17. The method of claim 10, comprising:

identifying, by the one or more processors, the derate factor by a model of the battery configured to provide the derate factor based on the temperature measurement, the state of charge measurement, a charge capacity and a discharge capacity input into the model.

18. The method of claim 10, comprising:

identifying, by the one or more processors, the derate factor using a physics-based model of the battery, the physics-based model configured to use the temperature measurement and the state of charge measurement to determine at least one of: a voltage response of the battery, an anode potential of the battery, a solid electrolyte interphase (SEI) growth rate in the battery or a temperature increase of the battery.

19. A vehicle comprising:

one or more processors to:

facilitate, responsive to a first action by an actuator of an electric vehicle, a discharge of a battery of the electric vehicle;

identify, responsive to a second action by the actuator of the electric vehicle, a discharge capacity of the battery corresponding to the discharge associated with the first action by the actuator;

determine, responsive to the second action, a temperature measurement and a state of charge measurement of the battery;

determine, based on the temperature measurement, the state of charge measurement and the discharge capacity, a derate factor for charging the battery, wherein the derate factor is used to modify a current level supplied to the battery during charging of the battery from energy generated responsive to the second action; and cause the battery to be charged according to the modified current level and the energy generated by the actuator.

20. The vehicle of claim 19, comprising the one or more processors to:

detect the energy generated by the actuator comprising one of a brake or a motor of the electric vehicle;

identify, responsive to the first action, a charge capacity of the battery;

cause the battery to be charged using the current limited according to the derate factor determined via a lookup table generated using a physics-based model configured to provide the derate factor according to one or more temperature measurement values of the battery, one or more state of charge measurement values of the battery and one or more ratios of a discharge capacity of the battery and the charge capacity of the battery input into the physics-based model.

* * * * *